United States Patent
Tsujimoto et al.

(10) Patent No.: US 11,503,213 B2
(45) Date of Patent: Nov. 15, 2022

(54) IMAGE CAPTURING APPARATUS, CONTROL METHOD, AND RECORDING MEDIUM

(71) Applicant: CANON KABUSHIKI KAISHA, Tokyo (JP)

(72) Inventors: Yuki Tsujimoto, Tokyo (JP); Yoshinobu Iida, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 16/910,649

(22) Filed: Jun. 24, 2020

(65) Prior Publication Data

US 2020/0322540 A1    Oct. 8, 2020

Related U.S. Application Data

(63) Continuation of application No. PCT/JP2018/042696, filed on Nov. 19, 2018.

(30) Foreign Application Priority Data

Dec. 26, 2017  (JP) ............................. JP2017-250106
Nov. 2, 2018  (JP) ............................. JP2018-207633

(51) Int. Cl.
*H04N 5/232* (2006.01)
*G06F 3/16* (2006.01)
(Continued)

(52) U.S. Cl.
CPC ......... *H04N 5/23299* (2018.08); *G06F 3/167* (2013.01); *G10L 15/22* (2013.01);
(Continued)

(58) Field of Classification Search
USPC .............. 348/142, 169, 170, 208.14, 208.16
See application file for complete search history.

(56) References Cited

U.S. PATENT DOCUMENTS 5,686,957 A   11/1997  Baker
8,891,823 B2  11/2014  Sato
(Continued)

FOREIGN PATENT DOCUMENTS

CN    2904500 Y    5/2007
CN    102496195 A  6/2012
(Continued)

OTHER PUBLICATIONS

Notification of the First Office Action issued by the China National Intellectual Property Administration dated Apr. 27, 2021 in corresponding CN Patent Application No. 201880084139.5, with English translation.

(Continued)

*Primary Examiner* — Yosef K Laekemariam
(74) *Attorney, Agent, or Firm* — Carter, DeLuca & Farrell LLP

(57) ABSTRACT

An image capturing apparatus comprising: an image capturing unit; a sound collecting unit; a detecting unit for detecting sound pressure level of a voice sound collected by the sound collecting unit, a recognizing unit for recognizing that a voice sound collected by the sound collecting unit is an instruction for shooting by the image capturing unit; and a control unit, wherein the control unit controls the image capturing unit to shoot in response that the detecting unit detects sound pressure level of a voice sound collected by the sound collecting unit is larger than a predetermined sound pressure level, and that the recognizing unit recognizes the voice sound as an instruction for shooting by the image capturing unit.

13 Claims, 15 Drawing Sheets

(51) Int. Cl.
   *H04R 3/00*   (2006.01)
   *G10L 15/22*   (2006.01)

(52) U.S. Cl.
   CPC ....... *H04N 5/232411* (2018.08); *H04R 3/005* (2013.01); *G10L 2015/223* (2013.01)

(56) References Cited

U.S. PATENT DOCUMENTS

| 9,288,740 | B2 | 3/2016 | Sato |
| 2004/0089814 | A1 | 5/2004 | Cheatle |
| 2005/0114132 | A1 | 5/2005 | Hsu |
| 2005/0286879 | A1 | 12/2005 | Nakaya |
| 2016/0182800 | A1 | 6/2016 | Kaneko |
| 2017/0263058 | A1 | 9/2017 | Muta |
| 2018/0091704 | A1 | 3/2018 | Koyama et al. |

FOREIGN PATENT DOCUMENTS

| CN | 102833476 A | 12/2012 | |
| CN | 103595953 A | 2/2014 | |
| CN | 103957359 A | 7/2014 | |
| CN | 104978956 * | 10/2015 | ............. G06F 17/30 |
| CN | 104978956 A | 10/2015 | |
| CN | 106292991 A | 1/2017 | |
| JP | H09205574 A | 8/1997 | |
| JP | H09289609 A | 11/1997 | |
| JP | H10304329 A | 11/1998 | |
| JP | 2000165718 A | 6/2000 | |
| JP | 2003274358 A | 9/2003 | |
| JP | 2005184485 A | 7/2005 | |
| JP | 2005217862 A | 8/2005 | |
| JP | 2009177480 * | 8/2009 | ............. G03B 15/00 |
| JP | 2009177480 A | 8/2009 | |
| JP | 2010004303 A | 1/2010 | |
| JP | 2011166608 A | 8/2011 | |
| JP | 2011188055 A | 9/2011 | |
| JP | 2013121078 A | 6/2013 | |
| JP | 2016156877 A | 9/2016 | |
| JP | 2016536868 A | 11/2016 | |
| WO | 2007099908 A1 | 9/2007 | |
| WO | 2015055655 A1 | 4/2015 | |
| WO | 2016151925 A1 | 9/2016 | |

OTHER PUBLICATIONS

International Search Report and Written Opinion issued by the Japan Patent Office dated Feb. 12, 2019 in corresponding International Application No. PCT/JP2018/042695, with English translation of Search Report.

International Search Report and Written Opinion issued by the Japan Patent Office dated Feb. 19, 2019 in corresponding International Application No. PCT/JP2018/042696, with English translation of Search Report.

Notification of First Office Action issued by the China National Intellectual Property Administration dated Mar. 25, 2021 in corresponding CN Patent Application No. 201880083608.1, with English translation.

Notification of the Second Office Action issued by the China National Intellectual Property Administration dated Nov. 15, 2021 in corresponding CN Patent Application No. 201880084139.5, with English translation.

Non-Final Office Action issued by the U.S. Patent and Trademark Office dated Aug. 9, 2022 in corresponding U.S. Appl. No. 16/910,622.

* cited by examiner

FIG. 7

COMMAND

| | |
|---|---|
| ACTIVATE | "Hi, Camera", "Wake-up, Camera" |
| STOP | "Good bye Camera", "ByeBye Camera" |
| CAPTURE STILL IMAGE | "Snap me", "Take a picture" |
| START MOVING IMAGE SHOOTING | "Start movie", "Take a video" |
| END MOVING IMAGE SHOOTING | "Stop movie" |
| START TRACKING | "Follow me", "Track me" |
| END TRACKING | "Stop Following", "Stop tracking" |
| ⋮ | |
| START AUTOMATIC MOVING IMAGE SHOOTING | "Start Auto movie" |
| ⋮ | |
| ENLARGEMENT COMMAND | "Zoom In" |
| REDUCTION COMMAND | "Zoom Out" |

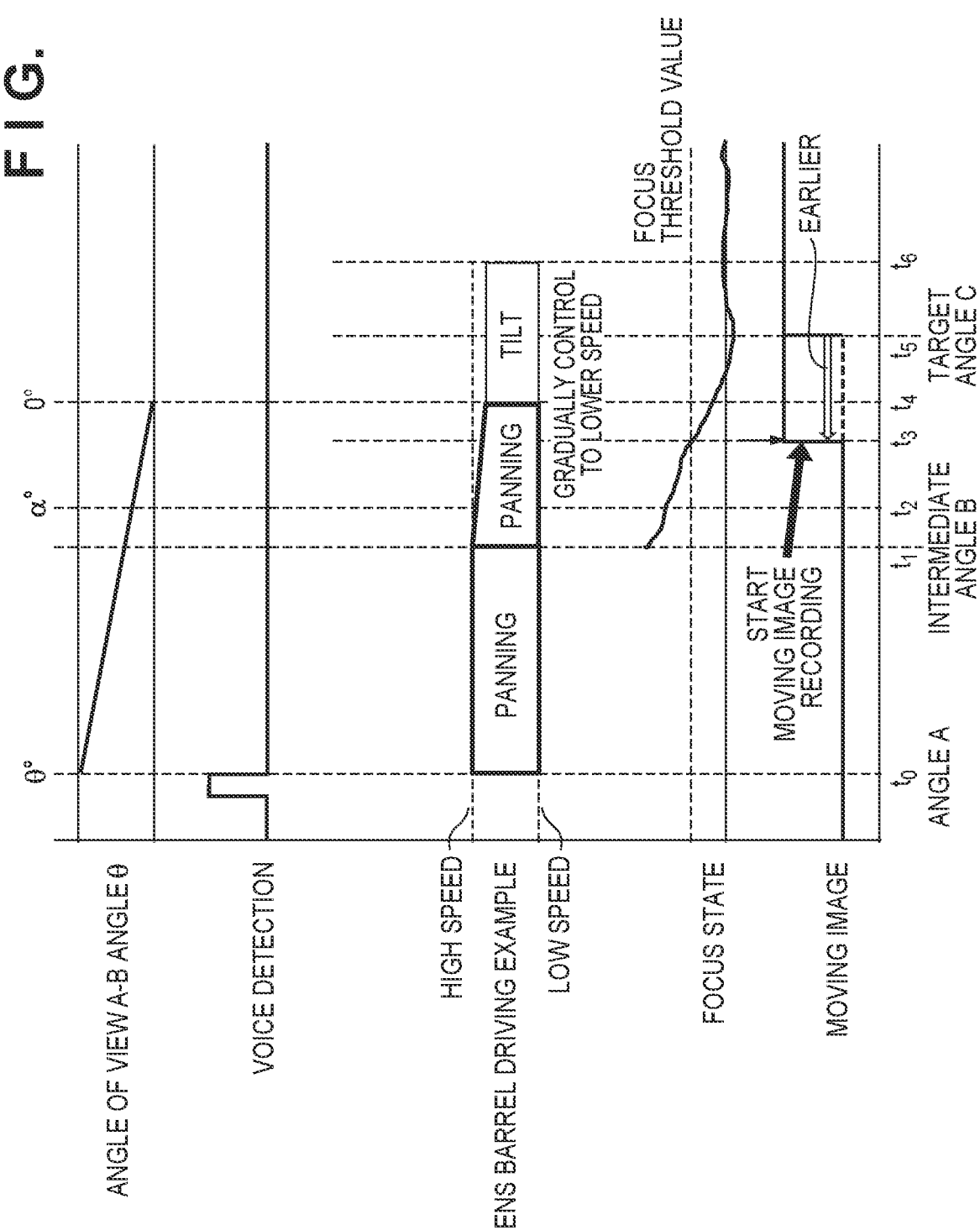

IMAGE CAPTURING APPARATUS, CONTROL METHOD, AND RECORDING MEDIUM

CROSS-REFERENCE TO RELATED APPLICATIONS

This application is a Continuation of International Patent Application No. PCT/JP2018/042696, filed Nov. 19, 2018, which claims the benefit of Japanese Patent Application No. 2017-250106, filed Dec. 26, 2017 and Japanese Patent Application No. 2018-207633, filed Nov. 2, 2018 both of which are hereby incorporated by reference herein in their entirety.

BACKGROUND

Field of the Disclosure

The present disclosure relates to an image capturing apparatus, a control method thereof, and a recording medium.

Description of the Related Art

When a still image or a moving image is shot using an image capturing apparatus such as a camera, a user usually shoots an image after determining a shooting target through a finder or the like, and confirming the shooting situation by him/herself and adjusting the framing of an image to be. Such an image capturing apparatus is provided with a function of notifying, upon detection of an error, the user of an operational error made by the user, or detecting the external environment and notifying the user of being in an environment not suitable for shooting. Also, there is a known mechanism in which a camera is controlled to enter a state suitable for shooting.

In contrast to such an image capturing apparatus that executes shooting in accordance with a user operation, a life log camera in the publication of Japanese Patent Laid-Open No. 2016-536868 is present that performs shooting intermittently and successively without a user giving shooting instructions.

However, because a known life log camera of a type that is attached to the body of a user performs automatic shooting regularly, there are cases where the obtained images are not related to the user's intention.

SUMMARY

An image capturing apparatus comprising: an image capturing unit; a sound collecting unit; a detecting unit for detecting sound pressure level of a voice sound collected by the sound collecting unit, a recognizing unit for recognizing that a voice sound collected by the sound collecting unit is an instruction for shooting by the image capturing unit; and a control unit, wherein the control unit controls the image capturing unit to shoot in response that the detecting unit detects sound pressure level of a voice sound collected by the sound collecting unit is larger than a predetermined sound pressure level, and that the recognizing unit recognizes the voice sound as an instruction for shooting by the image capturing unit.

Further features of various embodiments will become apparent from the following description of exemplary embodiments with reference to the attached drawings.

BRIEF DESCRIPTION OF THE DRAWINGS

The attached drawings are included in the specification and constitute the specification, illustrate embodiments of the present disclosure, and are used to describe the principle of the present disclosure together with the description of the specification.

FIG. 7 is a diagram illustrating the relationship between meanings of voice commands and the voice commands in an embodiment.

FIG. 12 is a diagram illustrating operations of an image capturing apparatus in the second embodiment.

DESCRIPTION OF THE EMBODIMENTS

Hereinafter, embodiments will be described in detail according to the attached drawings.

First Embodiment

Figure 1:
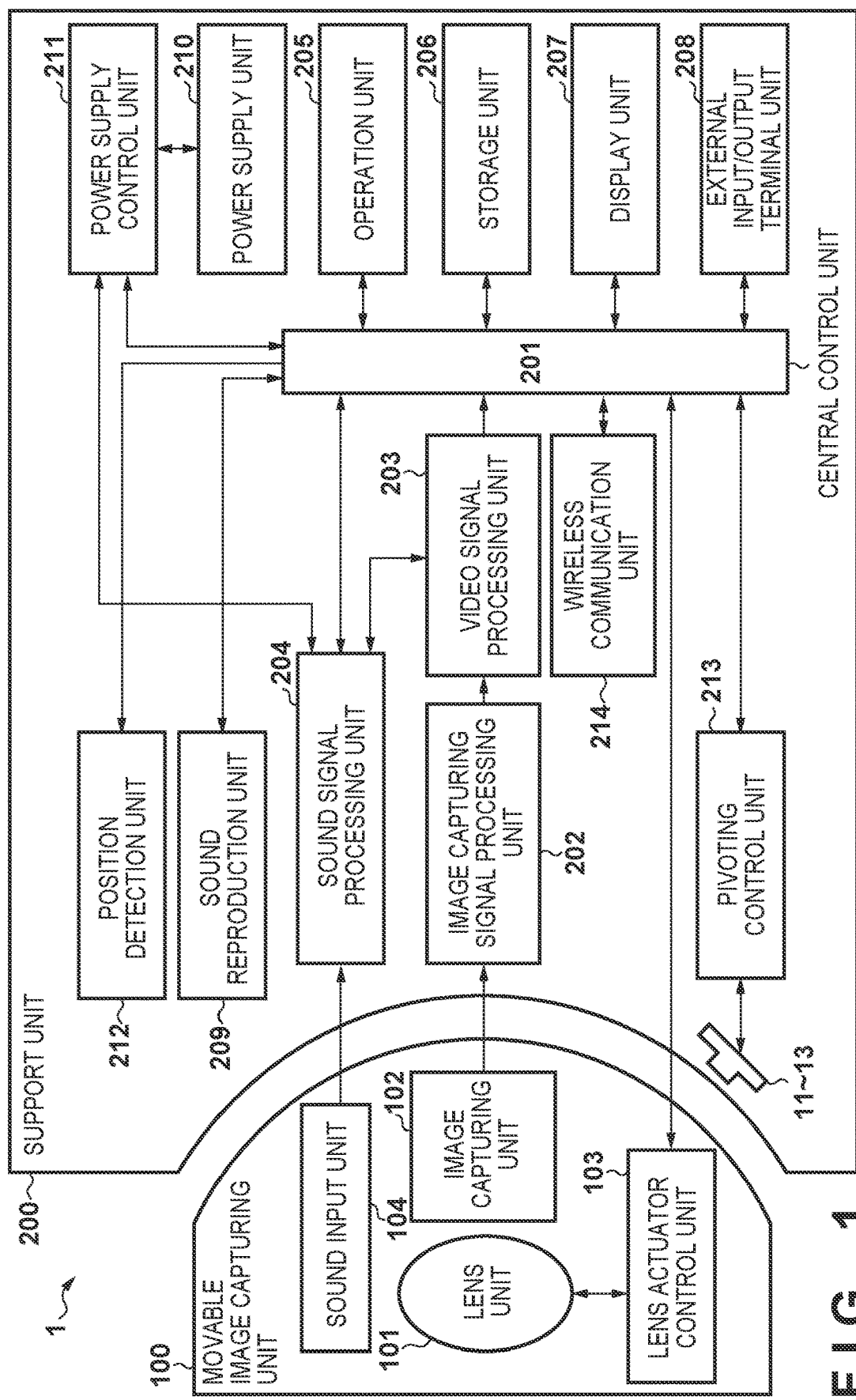
FIG. 1 is a block diagram of an image capturing apparatus according to an embodiment.

FIG. 1 is a block configuration diagram of an image capturing apparatus 1 according to a first embodiment. The image capturing apparatus 1 is constituted by a movable image capturing unit 100 that includes an optical lens unit, and in which the direction in which image capturing is performed (optical axis direction) is variable, and a support unit 200 that includes a central control unit (CPU) that performs drive control of the movable image capturing unit 100, and controls the entirety of the image capturing apparatus.

Note that the support unit 200 is provided with a plurality of driving units 11 to 13 including piezoelectric elements in contact with a face of the movable image capturing unit 100. The movable image capturing unit 100 performs panning and tilting operations by controlling the vibrations of these driving units 11 to 13. Note that the configuration may be such that the panning and tilting operations are realized using servomotors or the like.

The movable image capturing unit 100 includes a lens unit 101, an image capturing unit 102, a lens actuator control unit 103, and a sound input unit 104.

The lens unit 101 is constituted by a shooting optical system including a zoom lens, a diaphragm/shutter, a focus lens, and the like. The image capturing unit 102 includes an image sensor such as a CMOS sensor or a CCD sensor, photoelectrically converts an optical image formed by the lens unit 101 to an electric signal, and outputs the electric signal. The lens actuator control unit 103 includes a motor driver IC, and drives various actuators for the zoom lens, the diaphragm/shutter, the focus lens, and the like of the lens unit 101. The various actuators are driven based on actuator drive instruction data received from a central control unit 201 in the support unit 200, which will be described later. The sound input unit 104 is a sound input unit including a microphone (hereinafter, mic), and is constituted by a plurality of mics (four mics, in the present embodiment), and converts sound to an electric signal, converts the electric signal to a digital signal (sound data), and outputs the digital signal.

Meanwhile, the support unit 200 includes the central control unit 201 for controlling the entirety of the image capturing apparatus 1. The central control unit 201 is constituted by a CPU, a ROM in which programs to be executed by the CPU are stored, and a RAM that is used as a work area of the CPU. Also, the support unit 200 includes an image capturing signal processing unit 202, a video signal processing unit 203, a sound signal processing unit 204, an operation unit 205, a storage unit 206, and a display unit 207. The support unit 200 further includes an external input/output terminal unit 208, a sound reproduction unit 209, a power supply unit 210, a power supply control unit 211, a position detection unit 212, a pivoting control unit 213, a wireless communication unit 214, and the driving units 11 to 13 described above.

The image capturing signal processing unit 202 converts an electric signal output from the image capturing unit 102 of the movable image capturing unit 100 to a video signal. The video signal processing unit 203 processes the video signal output from the image capturing signal processing unit 202 in accordance with the application. The processing of the video signal includes cutting-out of an image, an electronic image stabilization operation realized by rotation processing, and subject detection processing for detecting a subject (face).

The sound signal processing unit 204 performs sound processing on a digital signal output from the sound input unit 104. When the sound input unit 104 is a mic that outputs an analog signal, the sound signal processing unit 204 may include a constituent element that converts an analog signal to a digital signal. Note that the details of the sound signal processing unit 204 including the sound input unit 104 will be described later using FIG. 2.

The operation unit 205 functions as a user interface between the image capturing apparatus 1 and a user, and is constituted by various switches, buttons, and the like. The storage unit 206 stores various types of data such as video information obtained by shooting. The display unit 207 includes a display such as an LCD, and displays an image as necessary based on a signal output from the video signal processing unit 203. Also, the display unit 207 functions as a portion of the user interface by displaying various menus and the like. The external input/output terminal unit 208 receives/outputs a communication signal and a video signal from/to an external apparatus. The sound reproduction unit 209 includes a speaker, converts sound data to an electric signal, and reproduces sound. The power supply unit 210 is a power supply source necessary for driving the entirety (constituent elements) of the image capturing apparatus, and is assumed to be a rechargeable battery in the present embodiment.

The power supply control unit 211 controls supply/cutoff of power from the power supply unit 210 to each of the constituent elements described above in accordance with the state of the image capturing apparatus 1. A constituent element that is not used is present depending on the state of the image capturing apparatus 1. The power supply control unit 211 executes a function of suppressing power consumption by cutting off power to constituent elements that are not used in accordance with the state of the image capturing apparatus 1 under the control of the central control unit 201. Note that the power supply/cutoff will be made clear by a description given later.

The position detection unit 212 is constituted by a gyroscope, an acceleration sensor, a GPS, and the like, and detects a movement of the image capturing apparatus 1. The position detection unit 212 is also for dealing with a case where the user attaches the image capturing apparatus 1 to his/her body. The pivoting control unit 213 generates signals for driving the driving units 11 to 13 in accordance with an instruction of the optical axis direction from the central control unit 201, and outputs the signals. The piezoelectric elements of driving units 11 to 13 vibrate in accordance with driving signals applied from the pivoting control unit 213, and move the optical axis direction of movable image capturing unit 100. As a result, the movable image capturing unit 100 performs panning and tilting operations in a direction instructed by the central control unit 201.

A wireless communication unit 214 performs data transmission of image data or the like in conformity to a wireless standard such as WiFi (registered trade mark) or BLE (Bluetooth (registered trade mark) Low Energy).

Figure 2:
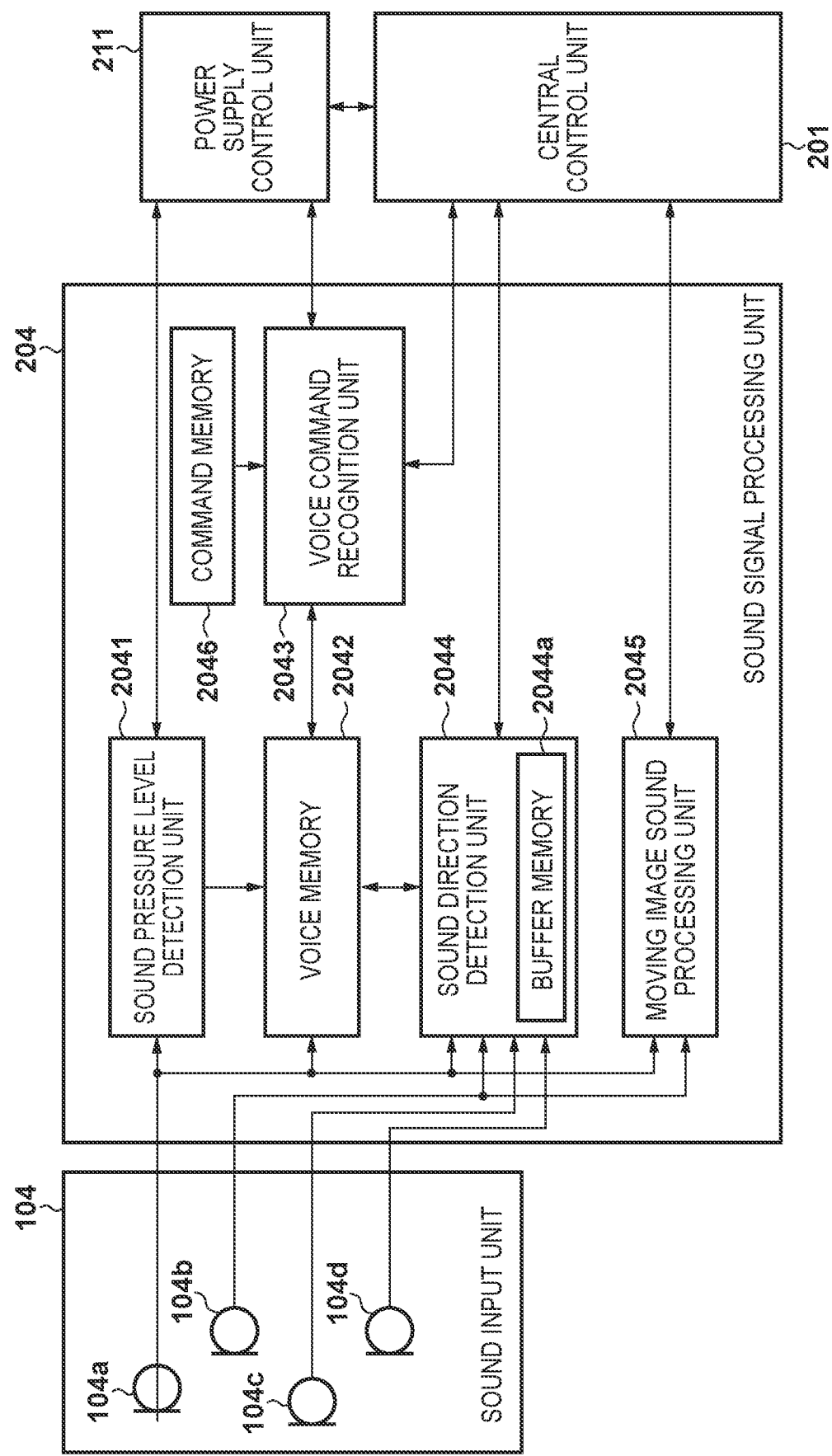
FIG. 2 is a detailed block diagram of a sound input unit and a sound signal processing unit according to an embodiment.

Next, the configurations of the sound input unit 104 and the sound signal processing unit 204 in the present embodiment, and sound direction detection processing will be described with reference to FIG. 2. FIG. 2 illustrates configurations of the sound input unit 104 and the sound signal processing unit 204, and a connection relationship between the sound signal processing 204, the central control unit 201, and the power supply control unit 211.

The sound input unit 104 is constituted by four nondirectional mics (mics 104a, 104b, and 104c, and mic 104d). Each mic includes an A/D converter, collects sound at a preset sampling rate (command detection and direction detection processing: 16 kHz, moving image recording: 48 kHz), converts the sound signal of collected sound to digital sound data using the internal A/D converter, and outputs the digital sound data. Note that, in the present embodiment, the sound input unit 104 is constituted by four digital mics, but may also be constituted by mics having an analog output. In the case of an analog mic, a corresponding A/D converter need only be provided in the sound signal processing unit 204. Also, the number of microphones in the present embodiment is four, but the number need only be three or more.

The mic 104a is unconditionally supplied with power when the image capturing apparatus 1 is powered on, and enters a sound collectable state. On the other hand, the other mics 104b, 104c, and 104d are targets of power supply/cutoff by the power supply control unit 211 under the control of the central control unit 201, and the power thereto is cut off in an initial state after the image capturing apparatus 1 has been powered on.

The sound signal processing unit 204 is constituted by a sound pressure level detection unit 2041, a voice memory 2042, a voice command recognition unit 2043, a sound direction detection unit 2044, a moving image sound processing unit 2045, and a command memory 2046.

When the sound pressure level indicated by sound data output from the mic 104a exceeds a preset threshold value, the sound pressure level detection unit 2041 supplies a signal indicating that sound has been detected to the power supply control unit 211 and the voice memory 2042.

The power supply control unit 211, upon receiving the signal indicating that sound has been detected from the sound pressure level detection unit 2041, supplies power to the voice command recognition unit 2043.

The voice memory 2042 is one of the targets of power supply/cutoff by the power supply control unit 211 under the control of the central control unit 201. Also, the voice memory 2042 is a buffer memory that temporarily stores sound data output from the mic 104a. When the sampling rate of the mic 104a is 16 kHz, sound data of two bytes (16 bit) per sampling is output, and the longest voice command is assumed to be five seconds, the voice memory 2042 needs to have a capacity of about 160 K bytes ($\cong 5 \times 16 \times 1000 \times 2$). Also, when the capacity of the voice memory 2042 is filled with sound data from the mic 104a, old sound data is over-written by new sound data. As a result, the voice memory 2042 holds sound data of the most recent predetermined period (five seconds, in the above example). Also, the voice memory 2042 starts storing sound data from the mic 104a in a sampling data region triggered by the reception of the signal indicating that sound has been detected from the sound pressure level detection unit 2041.

The command memory 2046 is constituted by a nonvolatile memory, and information regarding voice commands recognized by the image capturing apparatus is pre-stored (registered) therein. Although the details will be described later, the types of voice commands to be stored in the command memory 2046 are as shown in FIG. 7, for example. The information regarding a plurality of types of commands including an "activation command" is stored in the command memory 2046.

The voice command recognition unit 2043 is one of the targets of power supply/cutoff by the power supply control unit 211 under the control of the central control unit 201. Note that the speech recognition itself is a known technique, and therefore the description thereof is omitted here. The voice command recognition unit 2043 performs processing for recognizing sound data stored in the voice memory 2042 by referring to the command memory 2046. Also, the voice command recognition unit 2043 determines whether or not the sound data obtained by sound collection performed by the mic 104a is a voice command, and also determines which of the voice commands stored in the command memory 2046 matches the sound data. Also, the voice command recognition unit 2043, upon detecting sound data that matches one of the voice commands stored in the command memory 2046, supplies information indicating which of the commands has been determined and the start and end addresses (or a timing at which the voice command was accepted) of the sound data, of the sound data stored in the voice memory 2042, that is used to determine the voice command to the central control unit 201.

The sound direction detection unit 2044 is one of the targets of power supply/cutoff by the power supply control unit 211 under the control of the central control unit 201. Also, the sound direction detection unit 2044 periodically performs processing for detecting the direction in which a sound source is present based on sound data from the four mics 104a to 104d. The sound direction detection unit 2044 includes an internal buffer memory 2044a, and stores information indicating the detected sound source direction in the buffer memory 2044a. Note that the cycle (e.g., 16 kHz) at which the sound direction detection unit 2044 performs the sound direction detection processing may be sufficiently longer than the sampling cycle of the mic 104a. Note that the buffer memory 2044a is assumed to have a capacity sufficient for storing sound direction information for a duration that is the same as the duration of sound data that can be stored in the voice memory 2042.

The moving image sound processing unit 2045 is one of the targets of power supply/cutoff by the power supply control unit 211 under the control of the central control unit 201. The moving image sound processing unit 2045 receives two pieces of sound data from the mics 103a and 104b, of the four mics, as stereo sound data, and performs thereon sound processing for moving image sound such as various types of filtering processing, wind cut, stereo sense enhancement, driving sound removal, ALC (Auto Level Control), and compression processing. Although the details will be made clear from a description given later, in the present embodiment, the mic 104a functions as an L channel mic, of a stereo mic, and the mic 104b functions as an R channel mic.

Note that, in FIG. 2, the minimum number of connections, with respect to the four mics, between the mics of the sound input unit 104 and the blocks included in the sound signal processing unit 204 are illustrated considering the power consumption and the circuit configuration. However, the configuration may also be such that the plurality of microphones are shared for use by the blocks included in the sound signal processing unit 204 to the extent permitted by as the power and the circuit configuration. Also, in the present embodiment, the mic 104a is connected as a reference mic, but any mic may be a reference mic.

Figure 3A:
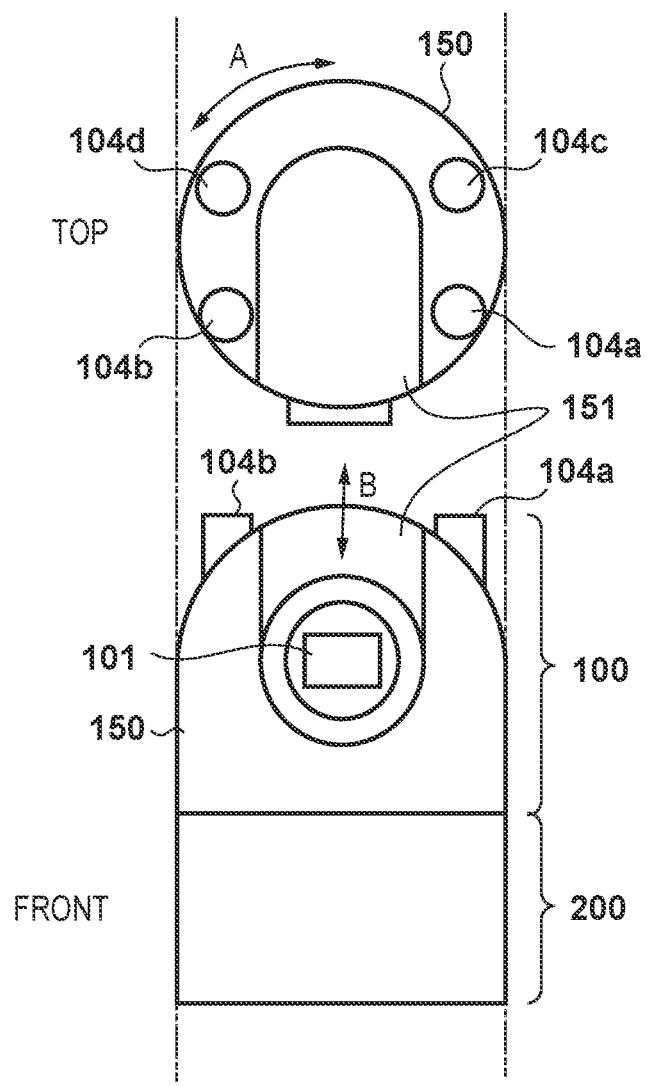
FIG. 3A is a front view and a top view of the image capturing apparatus according to an embodiment.

The external view and examples of use of the image capturing apparatus 1 will be described with reference to FIGS. 3A to 3E. FIG. 3A illustrates a top view and a front view of the external appearance of the image capturing apparatus 1 according to the present embodiment. The movable image capturing unit 100 of the image capturing apparatus 1 has a substantially hemispherical shape, and includes a first casing 150 that includes a cut-out window in a range from −20 degrees to 90 degrees, which indicates a vertical direction, where a horizontal plane parallel to the bottom face is 0 degrees, and is pivotable over 360 degrees in a horizontal plane indicated by an arrow A shown in the diagram. Also, the movable image capturing unit 100 includes a second casing 151 that can pivot along the cut-out window together with the lens unit 101 and the image capturing unit 102 in a range from the horizontal direction to the vertical direction as shown by an arrow B shown in the diagram. Here, the pivoting operation of the first casing 150 shown by the arrow A corresponds to a panning operation, and the pivoting operation of the second casing 151 shown by the arrow B corresponds to a tilting operation, and these operations are realized by driving the driving units 11 to 13. Note that the tiltable range of the image capturing apparatus in the present embodiment is assumed to be the range from −20 degrees to +90 degrees, as described above.

The mics 104a and 104b are arranged at positions on a front side so as to sandwich the cut-out window of the first casing 150. Also, the mics 104c and 104d are provided on a rear side of the first casing 150. As shown in FIG. 3A, even if the panning operation of the first casing 150 is performed in any direction along the arrow A in a state in which the second casing 151 is fixed, the relative positions of the mics 104a and 104b relative to the lens unit 101 and the image capturing unit 102 will not change. That is, the mic 104a is always positioned on a left side relative to an image capturing direction of the image capturing unit 102, and the mic 104b is always positioned on a right side. Also, the mics 104a and 104b are symmetrically arranged relative to the image capturing direction of the image capturing unit 102, and therefore the mic 104a is for L-channel input of a stereo mic, and the mic 104b is for R-channel input of the stereo mic. Therefore, a fixed relationship can be kept between the space represented by an image obtained by capturing performed by the image capturing unit 102 and the field of sound acquired by the mics 104a and 104b.

Note that the four mics 104a, 104b, 104c, and 104d in the present embodiment are arranged at positions of the vertices of a rectangle in a top view of the image capturing apparatus 1, as shown in FIG. 3A. Also, these four mics are assumed to be positioned on one horizontal plane in FIG. 3A, but small positional shifts are allowed.

The distance between the mic 104a and the mic 104b is larger than the distance between the mics 104a and 104c. Note that the distances between adjacent mics are desirably in a range from about 10 mm to 30 mm. Also, in the present embodiment, the number of microphones is four, but the number of microphones may be three or more as long as the condition that the mics are not arranged on a straight line is satisfied. Also, the arrangement positions of the mics 104a to 104d shown in FIG. 3A are exemplary, and the arrangement method may be appropriately changed depending on mechanical restrictions, design restrictions, and the like.

Figure 3B:
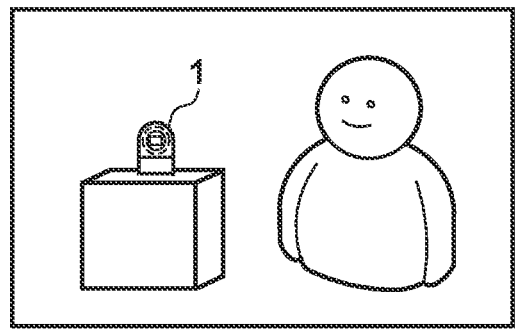
FIG. 3B is a diagram illustrating an example of use of the image capturing apparatus in an embodiment.
Figure 3C:
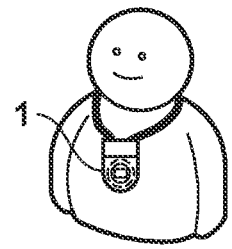
FIG. 3C is a diagram illustrating an example of use of the image capturing apparatus in an embodiment.
Figure 3D:
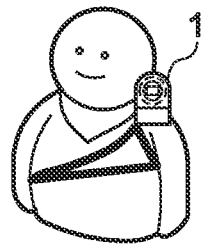
FIG. 3D is a diagram illustrating an example of use of the image capturing apparatus in an embodiment.
Figure 3E:
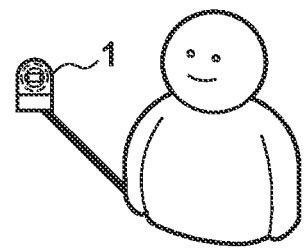
FIG. 3E is a diagram illustrating an example of use of the image capturing apparatus in an embodiment.

FIGS. 3B to 3E illustrate use modes of the image capturing apparatus 1 in the present embodiment. FIG. 3B is a diagram illustrating a usage mode in which the image capturing apparatus 1 is placed on a desk or the like, and the photographer himself/herself and the subjects around the photographer are shooting targets. FIG. 3C is a diagram illustrating a usage mode in which the image capturing apparatus 1 is hung from the neck of the photographer, and the subjects in front of the photographer are shooting targets when he/she moves. FIG. 3D is a diagram illustrating a usage mode in which the image capturing apparatus 1 is fixed to the shoulder of the photographer, and the surrounding subjects on front, rear, and right sides are shooting targets. Also, FIG. 3E is a diagram illustrating a usage mode in which the image capturing apparatus 1 is fixed to an end of a stick held by the user, with the aim of moving the image capturing apparatus 1 to a shooting position (high position, position that cannot be reached by a hand) desired by the user and performing shooting.

The panning and tilting operations of the image capturing apparatus 1 of the present embodiment will be described in further detail with reference to FIG. 4. Here, the description will be made assuming an exemplary use case where the image capturing apparatus 1 is placed to stand as shown in FIG. 3B, but the same can apply to the other use cases.

Figure 4:
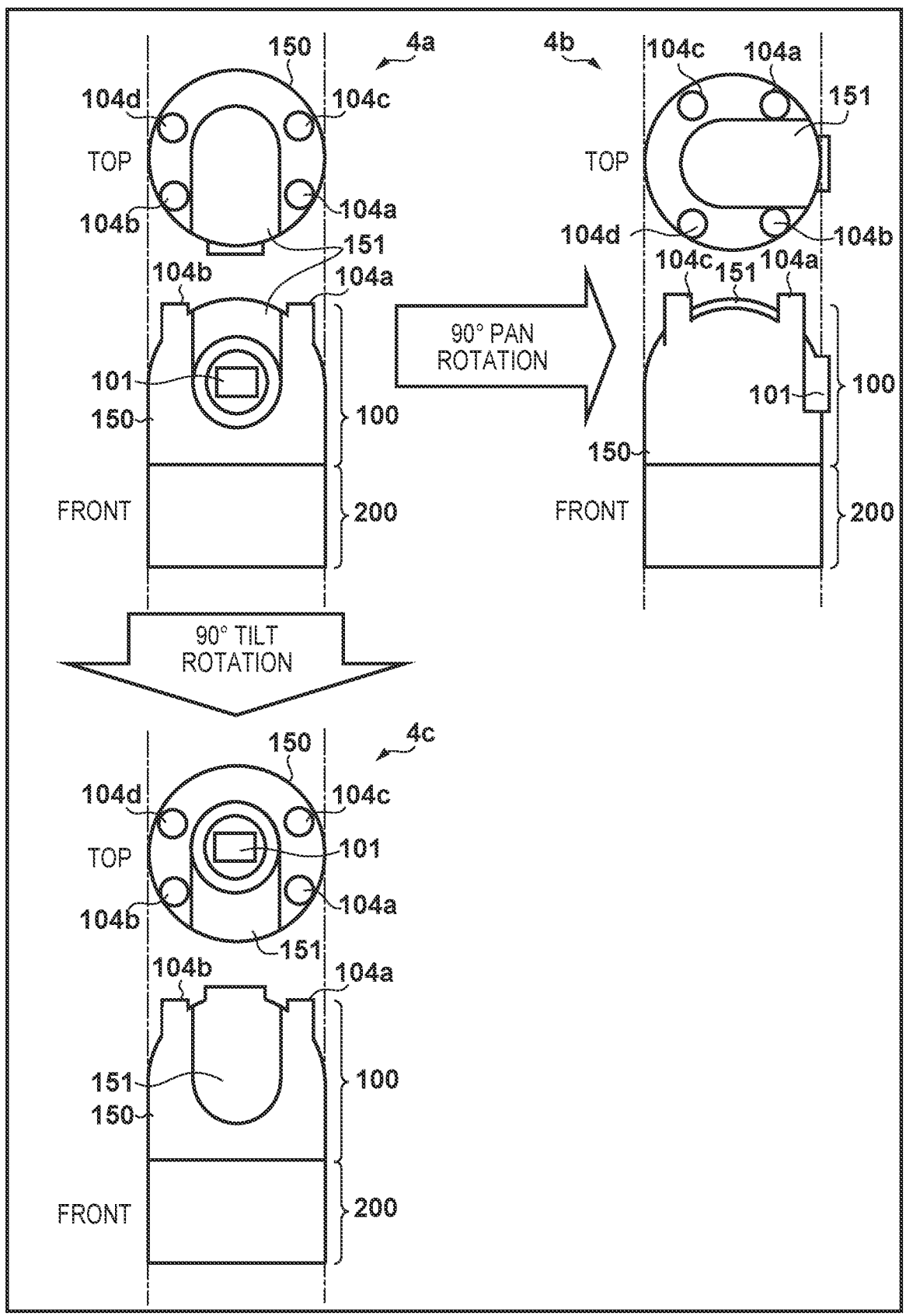
FIG. 4 is a diagram illustrating panning and tilting operations of the image capturing apparatus according to an embodiment.

4a in FIG. 4 denotes a state in which the lens unit 101 is directed in a horizontal direction. The state denoted by 4a in FIG. 4 is defined as an initial state, and when the first casing 150 performs a panning operation of 90 degrees in a counter-clockwise direction as viewed from above, the state denoted by 4b in FIG. 4 is entered. On the other hand, when the second casing 151 performs a tilting operation of 90 degrees from the initial state denoted by 4a in FIG. 4, the state denoted by 4c in FIG. 4 is entered. The pivoting of the first casing 150 and the second casing 151 is realized by vibrations of the driving units 11 to 13 that are driven by pivoting control unit 213, as described above.

Figure 5A:
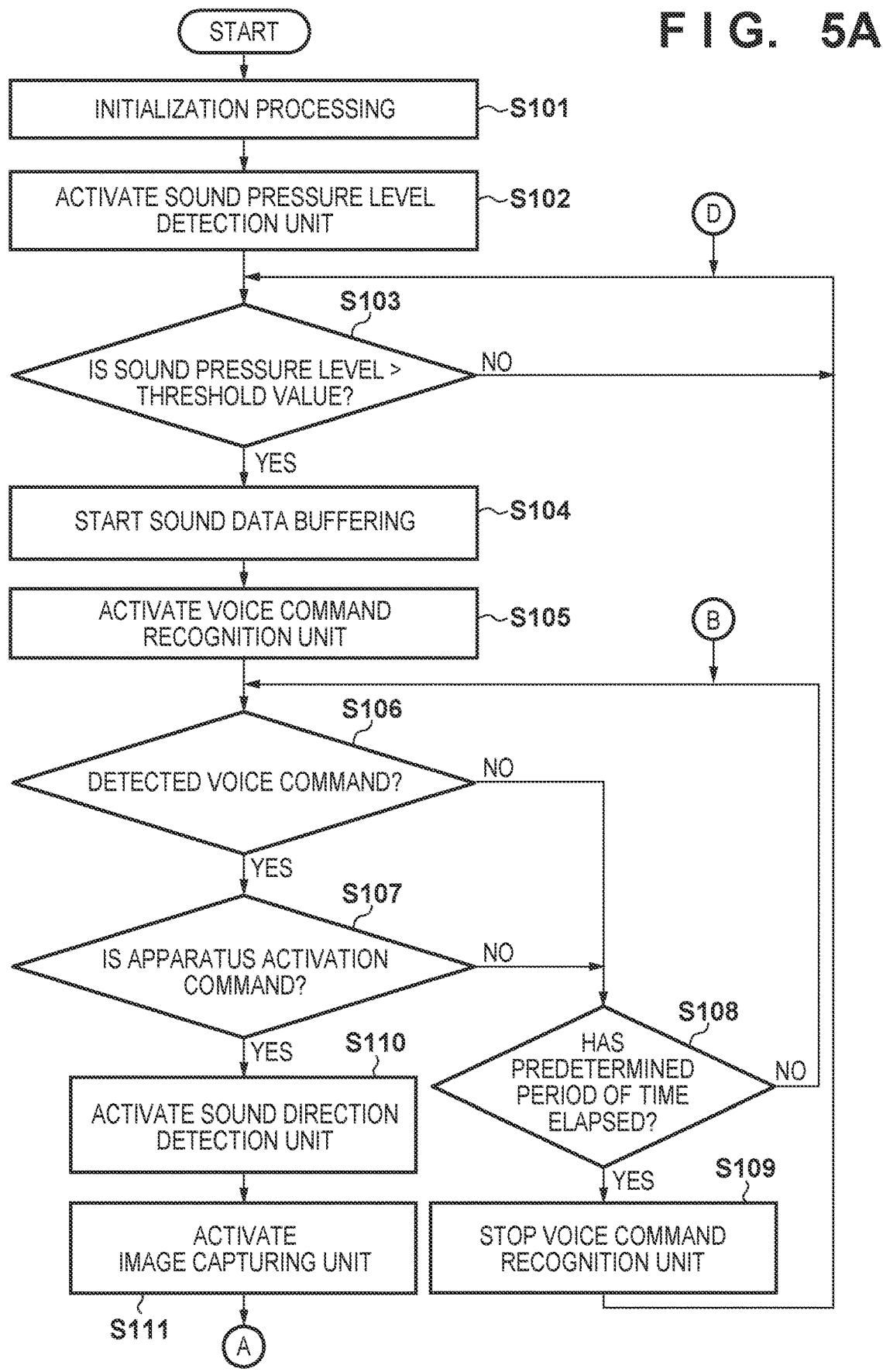
FIG. 5A is a flowchart illustrating a process procedure of a central control unit in an embodiment.
Figure 5B:
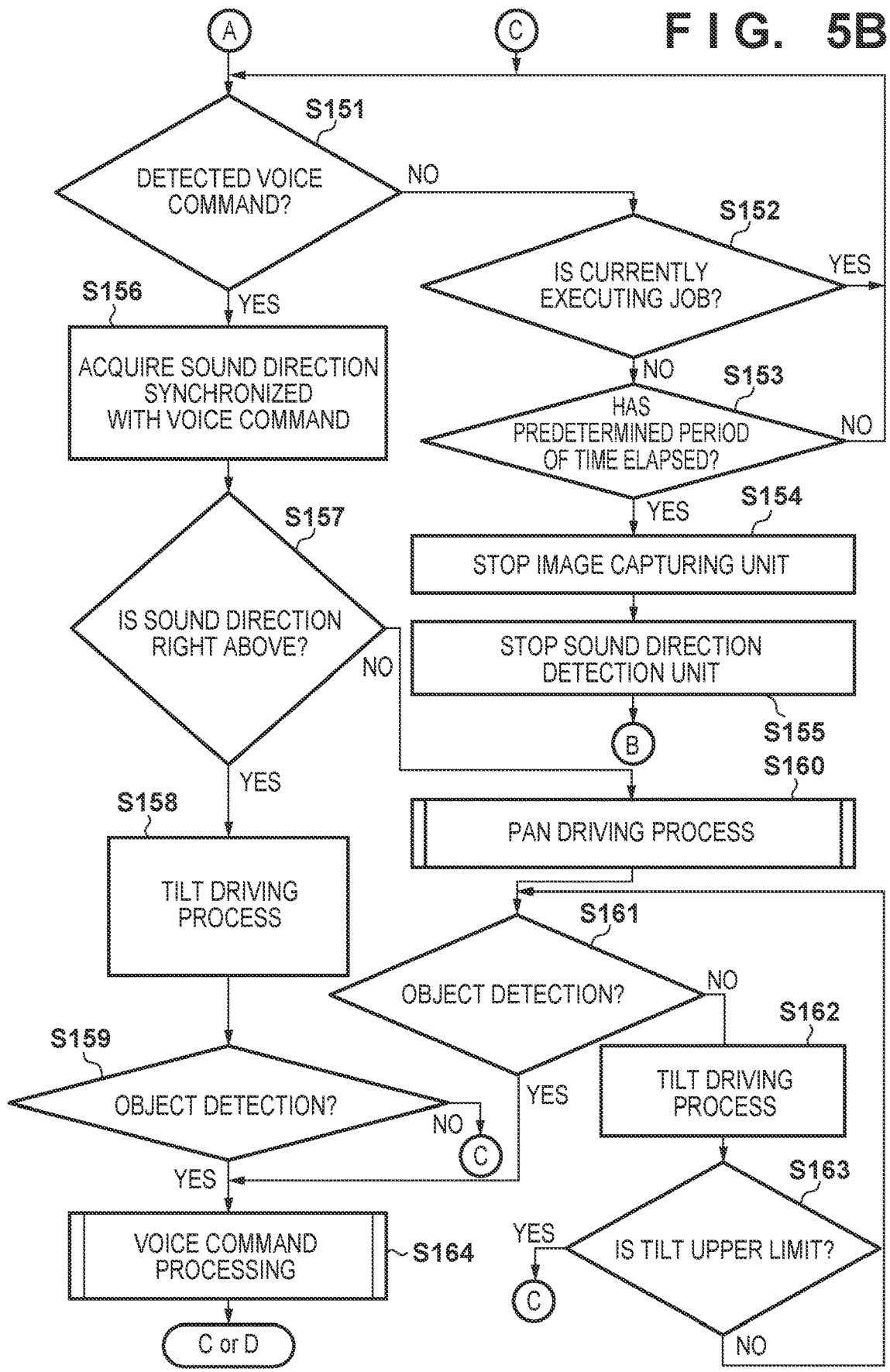
FIG. 5B is a flowchart illustrating the processing procedure of the central control unit in an embodiment.

Next, the procedure of processing performed by the central control unit 201 of the image capturing apparatus 1 will be described following the flowcharts shown in FIGS. 5A and 5B. The processing shown in FIGS. 5A and 5B illustrate the processing performed by the central control unit 201 when the main power supply of the image capturing apparatus 1 is turned on.

The central control unit 201 performs initialization processing of the image capturing apparatus 1 in step S101. In this initialization processing, the central control unit 201 determines the current directional component in a horizontal plane of the image capturing direction of the image capturing unit 102 in the movable image capturing unit 100 as a reference angle (0 degrees) of the panning operation.

Hereinafter, the component in the horizontal plane of the image capturing direction after a panning operation of the movable image capturing unit 100 is performed is represented by a relative angle from this reference angle. Also, the component in the horizontal plane of the sound source direction detected by the sound direction detection unit 2044 is also represented by a relative angle with respect to the reference angle. Also, although the details will be described later, the sound direction detection unit 2044 also performs determination as to whether or not a sound source is present in a direction of right above the image capturing apparatus 1 (axial direction of the rotation axis of a panning operation).

Note that, at this stage, power to the voice memory 2042, the sound direction detection unit 2044, the moving image sound processing unit 2045, and the mics 104b to 104d is cut off.

Upon the initialization processing being ended, the central control unit 201 starts supplying power to the sound pressure level detection unit 2041 and the mic 104a by controlling the power supply control unit 211, in step S102. As a result, the sound pressure level detection unit 2041 executes, based on sound data output from the mic 104a, processing for detecting the sound pressure level of sound before being converted into this sound data, and upon determining that the sound pressure level of the sound exceeds a preset threshold value, notifies the central control unit 201 of this fact. Note that the threshold value is set to 60 dB SPL (Sound Pressure Level), for example, but the threshold value may be changed by the image capturing apparatus 1 in accordance with the environment or the like, or sound components in a necessary frequency band may be focused on.

The central control unit 201 waits for, in step S103, the sound pressure level detection unit 2041 to detect sound of which sound pressure level exceeds the threshold value. When sound of which sound pressure level exceeds the threshold value is detected, in step S104, the voice memory 2042 starts processing for receiving and storing the sound data from the mic 104a.

Also, in step S105, the central control unit 201 starts supplying power to the voice command recognition unit 2043 by controlling the power supply control unit 211. As a result, the voice command recognition unit 2043 starts processing for recognizing the sound data that is stored in the voice memory 2042 with reference to the command memory 2046. Also, the voice command recognition unit 2043 performs processing for recognizing the sound data stored in the voice memory 2042, and upon recognizing a voice command that matches one of the voice commands in the command memory 2046, notifies the central control unit 201 of information including information for specifying the recognized voice command and information regarding the start and end addresses (or a timing at which the voice command was accepted) of the sound data, in the voice memory 2042, that is used to determine the recognized voice command.

In step S106, the central control unit 201 determines whether or not information indicating that a voice command has been recognized has been received from the voice command recognition unit 2043. If not, the central control unit 201 advances the processing to step S108, and determines whether or not the time elapsed from activation of the voice command recognition unit 2043 has exceeded a preset threshold value. Also, the central control unit 201 waits for the voice command recognition unit 2043 to recognize a voice command as long as the time elapsed is a threshold value or less. Then, if the voice command recognition unit 2043 has not recognized a voice command when the time indicated by the threshold value has elapsed, the central control unit 201 advances the processing to step S109. In step S109, the central control unit 201 cuts off power to the voice command recognition unit 2043 by controlling the power supply control unit 211. Then, the central control unit 201 returns the processing to step S103.

On the other hand, the central control unit 201, upon receiving information indicating that a voice command has been recognized from the voice command recognition unit 2043, advances the processing to step S107. In step S107, the central control unit 201 determines whether or not the recognized voice command corresponds to an activation command shown in FIG. 8. Also, the central control unit 201, upon determining that the recognized voice command is a command other than the activation command, advances the processing to step S108. Also, if the recognized voice command is the activation command, the central control unit 201 advances the processing from step S107 to step S110.

In step S110, the central control unit 201 starts supplying power to the sound direction detection unit 2044 and the mics 104b to 104d by controlling the power supply control unit 211. As a result, the sound direction detection unit 2044 starts processing for detecting the sound source direction based on the sound data from the four mics 104a to 104d at the same point in time. The processing for detecting the sound source direction is performed at a predetermined cycle. Also, the sound direction detection unit 2044 stores sound direction information indicating the detected sound direction in the internal buffer memory 2044a. Here, the sound direction detection unit 2044 stores the sound direction information in the buffer memory 2044a such that the timing of the sound data used for determination can be associated with a timing of the sound data stored in the voice memory 2042. Typically, the sound direction and the addresses of sound data in the voice memory 2042 may be stored in the buffer memory 2044a. Note that the sound direction information is information indicating an angle, in the horizontal plane, representing the difference of the sound source direction from the reference angle described above. Also, although the details will be described later, when the sound source is positioned right above the image capturing apparatus 1, information indicating that the sound source is in the direction of right above is set to the sound direction information.

In step S111, the central control unit 201 starts supplying power to the image capturing unit 102 and the lens actuator control unit 103 by controlling the power supply control unit 211. As a result, the movable image capturing unit 100 starts functioning as an image capturing apparatus.

Next, in step S151, the central control unit 201 determines whether or not information indicating that a voice command has been recognized is received from the voice command recognition unit 2043. If not, the central control unit 201 advances the processing to step S152, and determines whether or not a job in accordance with the instruction from the user is currently being executed. Although the details will be made clear by the description of the flowchart in FIG. 6, moving image shooting and recording, tracking processing, and the like correspond to jobs. Here, the description is continued assuming that such a job is not being executed.

In step S153, it is determined whether or not the time elapsed from when the previous voice command was recognized exceeds a preset threshold value. If not, the central control unit 201 returns the processing to step S151 and waits for a voice command to be recognized. Then, if a job is not being executed, and a new voice command has not been recognized even though the time elapsed from when the previous voice command was recognized exceeds the threshold value, the central control unit 201 advances the processing to step S154. In step S154, the central control unit 201 cuts off power supply to the image capturing unit 102 and the lens actuator control unit 103 by controlling the power supply control unit 211. Also, in step S155, the central control unit 201 also cuts off power supply to the sound direction detection unit 2044 by controlling the power supply control unit 211, and returns the processing to step S106.

It is assumed that the central control unit 201 has received information indicating that a voice command has been received from the voice command recognition unit 2043. In this case, the voice command recognition unit 2043 advances the processing from step S151 to step S156.

The central control unit 201 in the present embodiment performs, before executing a job in accordance with a recognized voice command, processing for bringing a person who spoke the voice command into a field of view of the image capturing unit 102 of the movable image capturing unit 100. Then, the central control unit 201 executes the job based on the recognized voice command in a state in which the person is in the field of view of the image capturing unit 102.

In order to realize the technique described above, in step S156, the central control unit 201 acquires sound direction information synchronized with the voice command recognized by the voice command recognition unit 2043 from the buffer memory 2044a of the sound direction detection unit 2044. The voice command recognition unit 2043, upon recognizing a voice command, notifies the central control unit 201 of the two addresses of the start and end of the voice command in the voice memory 2042. Then, the central control unit 201 acquires sound direction information detected in the period indicated by the two addresses from the buffer memory 2044a. There may be a case where a plurality of pieces of sound direction information are present in the period indicated by the two addresses. In this case, the central control unit 201 acquires the temporarily most recent sound direction information from the buffer memory 2044a. This is because the probability that the temporarily most recent sound direction information represents the current position of the person who spoke the voice command is high.

In step S157, the central control unit 201 determines whether or not the sound source direction indicated by the acquired sound information is the direction of right above the image capturing apparatus. Note that the details of the determination as to whether or not the sound direction is the direction of right above the image capturing apparatus will be described later.

If the sound source is present in the direction of right above the image capturing apparatus 1, the central control unit 201 advances the processing to step S158. In step S158, the central control unit 201 causes, by controlling the pivoting control unit 213, the second casing 151 of the movable image capturing unit 100 to pivot such that the image capturing direction of the lens unit 101 and the image capturing unit 102 is the right-above direction, as denoted by 4c in FIG. 4. When the image capturing direction of the image capturing unit 102 is set to the right-above direction, in step S159, the central control unit 201 receives a captured image from the video signal processing unit 203, and determines whether or not an object (face of a person), which can be a sound source, is present in the captured image. If not, the central control unit 201 returns the processing to step S151. On the other hand, if an object is present in the captured image, the central control unit 201 advances the processing to step S164, and executes a job corresponding to the already recognized voice command. Note that the details of processing in step S164 will be described later using FIG. 6.

In step S157, the central control unit 201, upon determining that the direction indicated by the sound information is a direction other than the right-above direction, advances the processing to step S160. In step S160, the central control unit 201 performs a panning operation of the movable image capturing unit 100, by controlling the pivoting control unit 213, such that the current angle in the horizontal plane of the image capturing unit 102 matches the angle in the horizontal plane indicated by the sound information. Then, in step S161, the central control unit 201 receives a captured image from the video signal processing unit 203, and determines whether or not an object (face), which can be a sound source, is present in the captured image. If not, the central control unit 201 advances the processing to step S162, and performs a tilting operation of the movable image capturing unit 100 toward the target object by controlling the pivoting control unit 213. Then, in step S163, the central control unit 201 determines whether or not the angle of the tilting direction of the image capturing direction of the image capturing unit 102 has reached an upper limit of the tilting operation (90 degrees from the horizontal direction, in the present embodiment). If not, the central control unit 201 returns the processing to step S161. In this way, the central control unit 201 determines whether or not an object (face), which can be a sound source, is present in the captured image from the video signal processing unit 203 while performing the tilting operation. Then, if an object has not been detected even if the angle of the tilting direction of the image capturing direction of the image capturing unit 102 has reached the upper limit of the tilting operation, the central control unit 201 returns the processing from step S163 to step S151. On the other hand, if an object is present in the captured image, the central control unit 201 advances the processing to step S164, and executes a job corresponding to the already recognized voice command.

Next, the details of processing in step S164 will be described based on the flowchart in FIG. 6 and a voice command table shown in FIG. 7. Pieces of voice pattern data corresponding to voice commands such as "Hi, Camera" shown in the voice command table in FIG. 7 are stored in the command memory 2046. Note that, representative voice commands are shown in FIG. 7. Note that the voice commands are not limited thereto. Also, it should be noted that the voice command in the following description is a voice command detected at the timing of step S151 in FIG. 5B.

First, in step S201, the central control unit 201 determines whether or not the voice command is an activation command.

The activation command is a voice command for causing the image capturing apparatus 1 to transition to a state in which image capturing is possible. The activation command is a command that is determined in step S107 in FIG. 5A, and is not a command for executing a job relating to image capturing. Therefore, if the recognized voice command is the activation command, the central control unit 201 ignores the command and returns the processing to step S151.

In step S202, the central control unit 201 determines whether or not the voice command is a pause command. The pause command is a command for causing the state to transition from a state in which a series of image capturing is possible to a state of waiting for input of the activation command. Therefore, if the recognized voice command is the stop command, the central control unit 201 advances the processing to step S211. In step S211, the central control unit 201 cuts off power to the image capturing unit 102, the sound direction detection unit 2044, the voice command recognition unit 2043, the moving image sound processing unit 2045, the mics 104b to 104d, and the like that are already activated, by controlling the power supply control unit 211, and stops these units. Then, the central control unit 201 returns the processing to step S103 at the time of activation.

In step S203, the central control unit 201 determines whether or not the voice command is a still image shooting command. The still image shooting command is a command for requesting the image capturing apparatus 1 to execute a shooting/recording job of one still image. Therefore, the central control unit 201, upon determining that the voice command is the still image shooting command, advances the processing to step S212. In step S212, the central control unit 201 records the one piece of still image data obtained by capturing performed by the image capturing unit 102 in the storage unit 206 as a JPEG file, for example. Note that the job of the still image shooting command is completed by performing shooting and recording of one still image, and therefore this job is not a determination target job in step S152 in FIG. 5B described above.

In step S204, the central control unit 201 determines whether or not the voice command is a moving image shooting command. The moving image shooting command is a command for requesting the image capturing apparatus 1 to capture and record a moving image. The central control unit 201, upon determining that the voice command is the moving image shooting command, advances the processing to step S213. In step S213, the central control unit 201 starts shooting and recording of a moving image using the image capturing unit 102, and returns the processing to step S151. In the present embodiment, the captured moving image is stored in the storage unit 206, but the captured moving image may be transmitted to a file server on a network via the external input/output terminal unit 208. The moving image shooting command is a command for causing capturing and recording of a moving image to continue, and therefore this job is a determination target job in step S152 in FIG. 5B described above.

In step S205, the central control unit 201 determines whether or not the voice command is a moving image shooting end command. If the voice command is the moving image shooting end command, and capturing/recording of a moving image is actually being performed, the central control unit 201 ends the recording (job). Then, the central control unit 201 returns the processing to step S151.

In step S206, the central control unit 201 determines whether or not the voice command is a tracking command. The tracking command is a command for requesting the image capturing apparatus 1 to cause the user to be continuously positioned in the image capturing direction of the image capturing unit 102. The central control unit 201, upon determining that the voice command is the tracking command, advances the processing to step S215. Then, in step S215, the central control unit 201 starts controlling the pivoting control unit 213 such that the object is continuously positioned at a central position of the video obtained by the video signal processing unit 203. Also, the central control unit 201 returns the processing to step S151. As a result, the movable image capturing unit 100 tracks the moving user by performing a panning operation or a tilting operation. Note that, although tracking of the user is performed, recording of the captured image is not performed. Also, while tracking is performed, the job is a determination target job in step S152 in FIG. 5B described above. Then, upon receiving a tracking end command, the central control unit 201 finally ends shooting and recording of the moving image. Note that jobs of the still image shooting command and moving image shooting command, for example, may be executed while tracking is performed.

In step S207, the central control unit 201 determines whether or not the voice command is the tracking end command. If the voice command is the tracking end command, and tracking is actually being performed, the central control unit 201 ends the tracking (job). Then, the central control unit 201 returns the processing to step S151.

In step S208, the central control unit 201 determines whether or not the voice command is an automatic moving image shooting command. The central control unit 201, upon determining that the voice command is the automatic moving image shooting command, advances the processing to step S217. In step S217, the central control unit 201 starts shooting and recording of a moving image by the image capturing unit 102, and returns the processing to step S151. The job executed by the automatic moving image shooting command differs from the job executed by the moving image shooting command described above in that, every time the user speaks, shooting/recording of a moving image is performed while the image capturing direction of the lens unit 101 is directed in the sound source direction of the voice. For example, in an environment of a meeting in which a plurality of speakers are present, a moving image is recorded while performing panning and tilting operations in order to, every time a speech is made, bring the speaker into the angle of view of the lens unit 101. Note that, in this case, while the job of the automatic moving image shooting command is being executed, a voice command for ending the job is not accepted. It is assumed that this job is ended by operating a predetermined switch provided in the operation unit 205. Also, the central control unit 201 stops the voice command recognition unit 2043 while this job is being executed. Also, the central control unit 201 performs panning and tilting operations of the movable image capturing unit 100 with reference to sound direction information detected by the sound direction detection unit 2044 at the timing at which the sound pressure level detection unit 2041 has detected a sound pressure level exceeding the threshold value.

Figure 6:
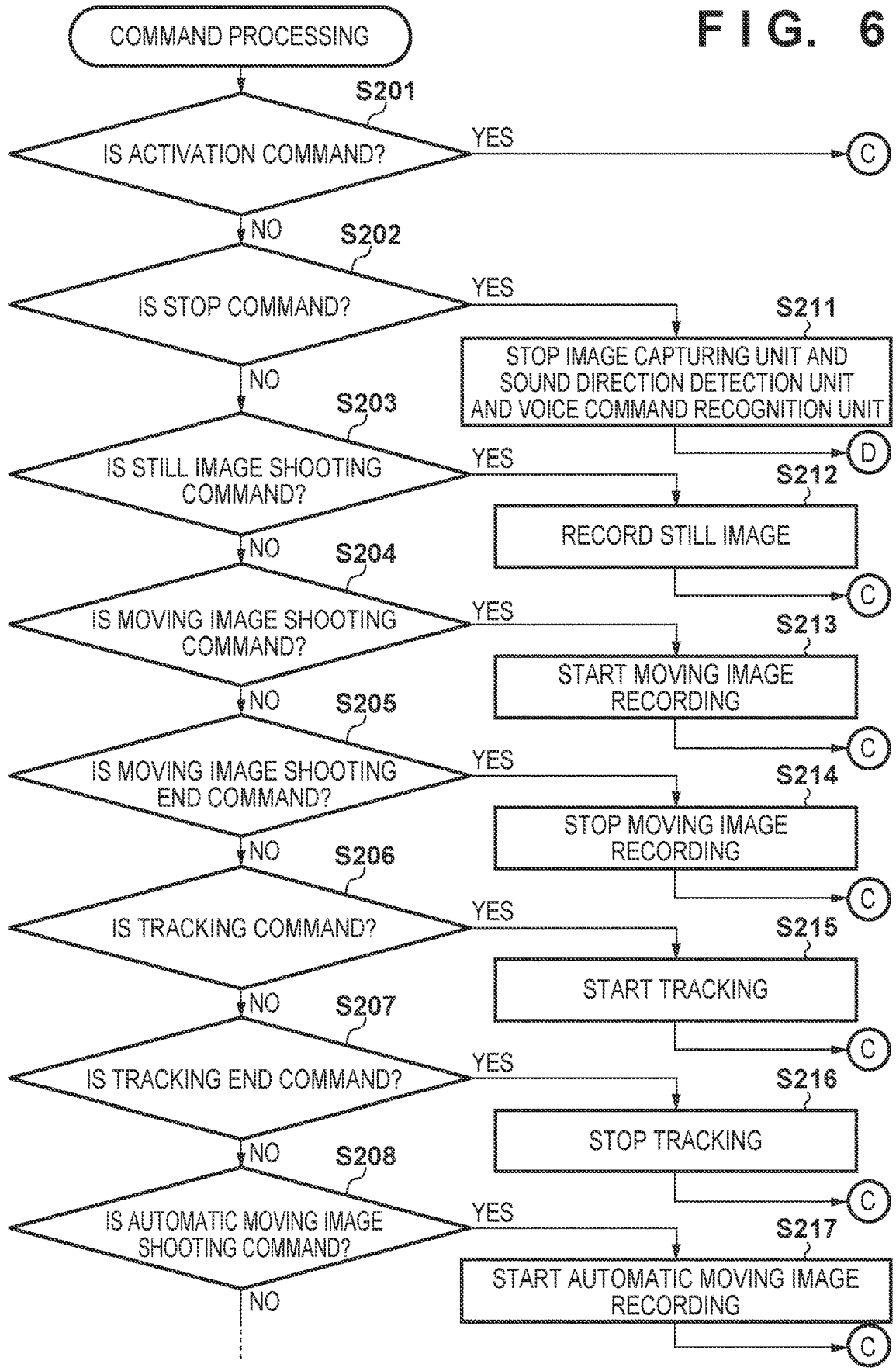
FIG. 6 is a flowchart illustrating the details of voice command processing in FIG. 5B.

Note that, although not illustrated in FIG. 6, if the recognized voice command is an enlargement command, the central control unit 201 increases the current zoom ratio by a preset value by controlling the lens actuator control unit 103. Also, if the recognized voice command is a reduction command, the central control unit 201 reduces the current zoom ratio by a preset value by controlling the lens actuator control unit 103. Note that if the lens unit 101 is already at a telephoto end or a wide angle end, the enlargement ratio or the reduction ratio cannot be further increased, and therefore when such a voice command is made, the central control unit 201 ignores the voice command.

The description has been made above. Voice commands other than the voice commands described above are to be executed in steps after step S207, but the description thereof will be omitted here.

Figure 8:
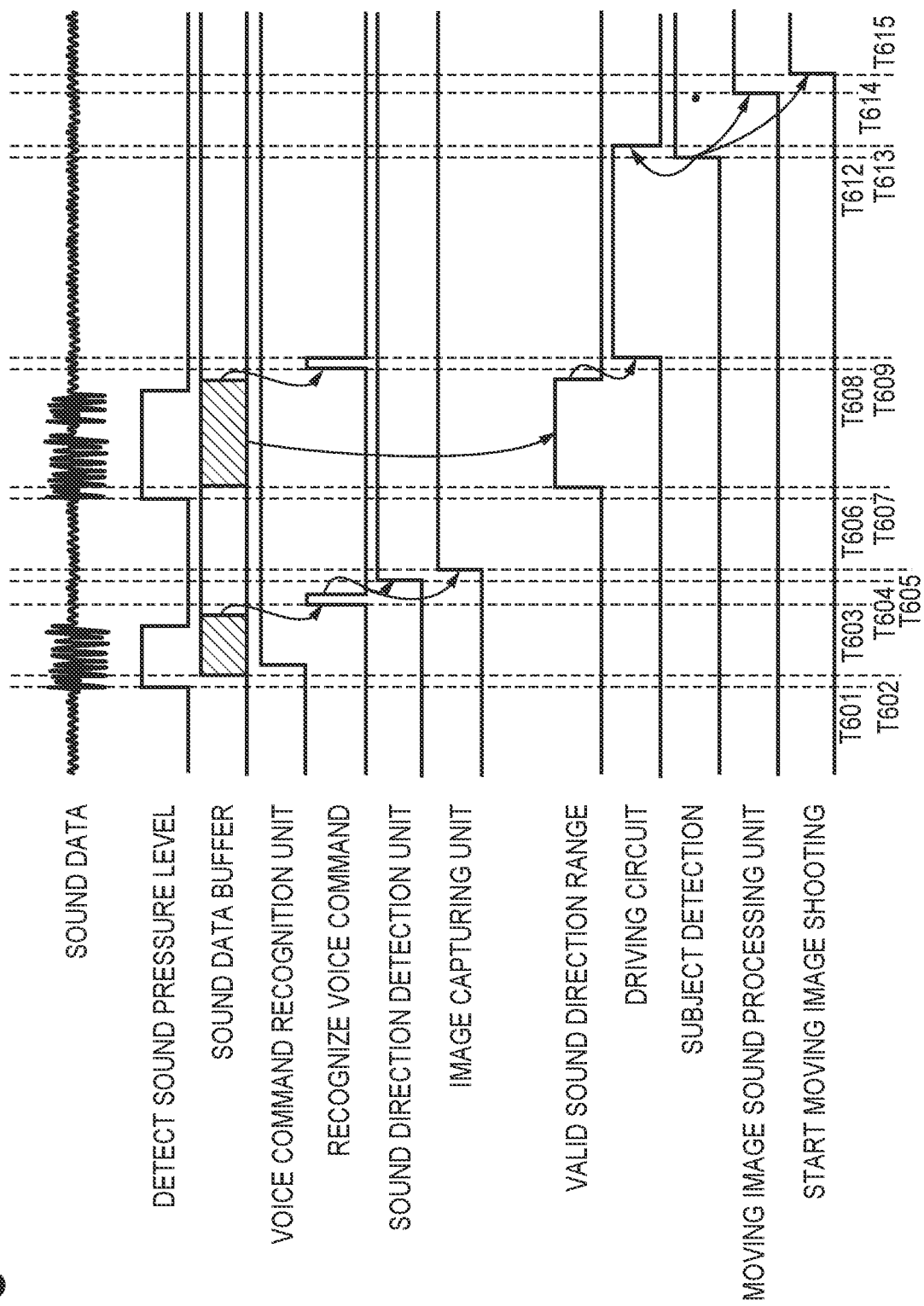
FIG. 8 is a timing chart from activation to an operation shooting start command in an embodiment.

Here, an example of the sequence from when the main power supply is turned on in the image capturing apparatus 1 in the present embodiment will be described following the timing chart shown in FIG. 8.

When the main power supply of the image capturing apparatus 1 is turned on, the sound pressure level detection unit 2041 starts processing for detecting the sound pressure level of sound data from the mic 104a. It is assumed that a user starts speaking the activation command "Hi, Camera", at timing T601. As a result, the sound pressure level detection unit 2041 detects a sound pressure exceeding the threshold value. Triggered by this detection, at timing T602, the voice memory 2042 starts storing sound data from the mic 104a, and the voice command recognition unit 2043 starts recognizing the voice command. When the user ends speaking of the activation command "Hi, Camera", at timing T603, the voice command recognition unit 2043 recognizes the voice command, and specifies that the recognized voice command is the activation command.

At timing T603, the central control unit 201 starts power supply to the sound direction detection unit 2044 triggered by the recognition of the activation command. Also, the central control unit 201 also starts power supply to the image capturing unit 102 at timing T604.

It is assumed that the user starts saying "Movie start", for example, at timing T606. In this case, the sound data at the timing of the start of the saying is stored in the voice memory 2042 in order from timing T607. Also, at timing T608, the voice command recognition unit 2043 recognizes the sound data as a voice command representing "Movie start". The voice command recognition unit 2043 notifies the central control unit 201 of the start and end addresses of sound data representing "Movie start" in the voice memory 2042 and the recognition result. The central control unit 201 determines the range indicated by the received start and end addresses as an active range. Also, the central control unit 201 extracts the latest sound direction information from the active range in the buffer memory 2044a of the sound direction detection unit 2044, and at timing T609, starts panning and tilting operations of the movable image capturing unit 100 by controlling the pivoting control unit 213 based on the extracted information.

When the image capturing signal processing unit 202, at timing T612, detects a subject (object: face) in an image generated using the image capturing unit 102 while the movable image capturing unit 100 is performing panning and tilting operations, the central control unit 201 stops the panning and tilting operations (timing T613). Also, at timing T614, the central control unit 201 supplies power to the moving image sound processing unit 2045 so as to enter a state in which stereo sound is collected by the mics 104a and 104b. Also, the central control unit 201 starts capturing and recording a moving image with sound, at timing T615.

Next, the processing for detecting the sound source direction performed by the sound direction detection unit 2044 in the present embodiment will be described. This processing is performed periodically and continuously after step S110 in FIG. 5A.

Figure 9A:
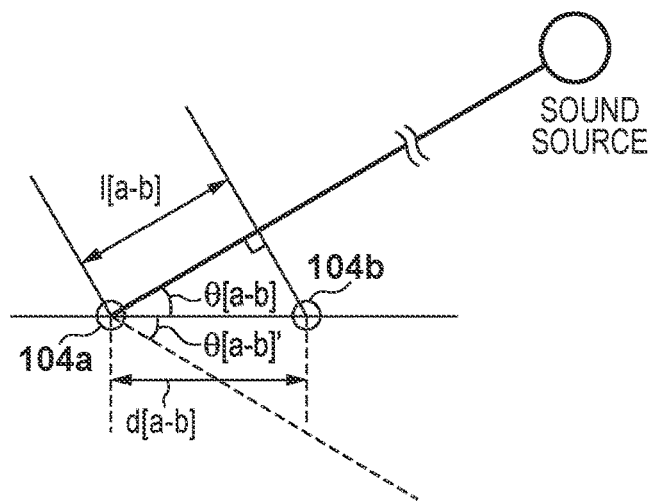
FIG. 9A is a diagram illustrating a sound direction detection method according to an embodiment.

First, a simple sound direction detection using two mics, namely the mics 104a and 104b, will be described using FIG. 9A. In FIG. 9A, it is assumed that the mics 104a and 104b are arranged on a plane (on a plane vertical to the rotation axis of a panning operation). The distance between the mics 104a and 104b is denoted by d[a-b]. It is assumed that the distance between the image capturing apparatus 1 and the sound source is sufficiently large relative to the distance d[a-b]. In this case, the delay time in sound between the mics 104a and 104b can be specified by comparing the sounds collected by the mics 104a and 104b.

The distance l[a-b] can be specified by multiplying the arrival delay time by the speed of sound (about 340 m/s in air). As a result, the sound source direction angle θ[a-b] can be specified using the following equation.

$$\theta[a-b] = a\cos(l[a-b]/d[a-b])$$

However, the sound direction obtained by using two mics cannot be distinguished between the obtained sound source direction θ[a-b] and θ[a-b]' (FIG. 9A). That is, which of the two directions cannot be specified.

Figure 9B:
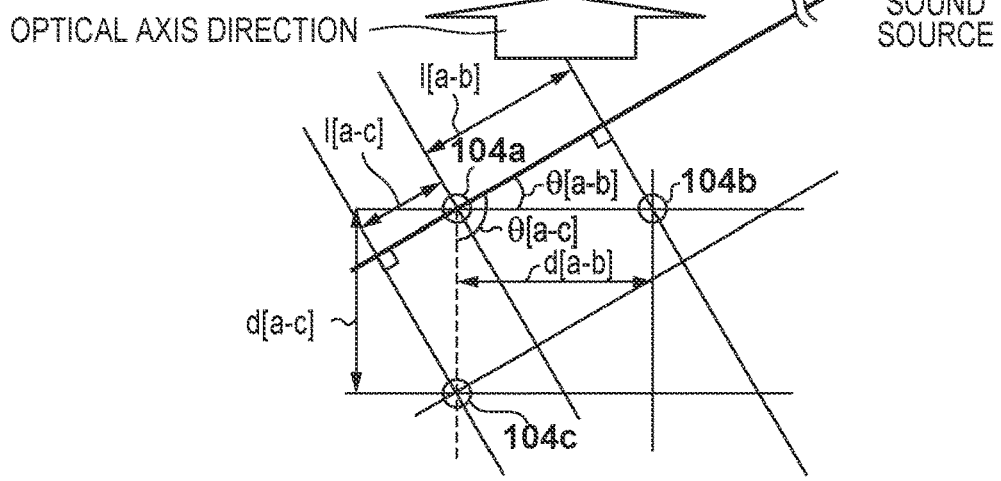
FIG. 9B is a diagram illustrating the sound direction detection method according to an embodiment.
Figure 9C:
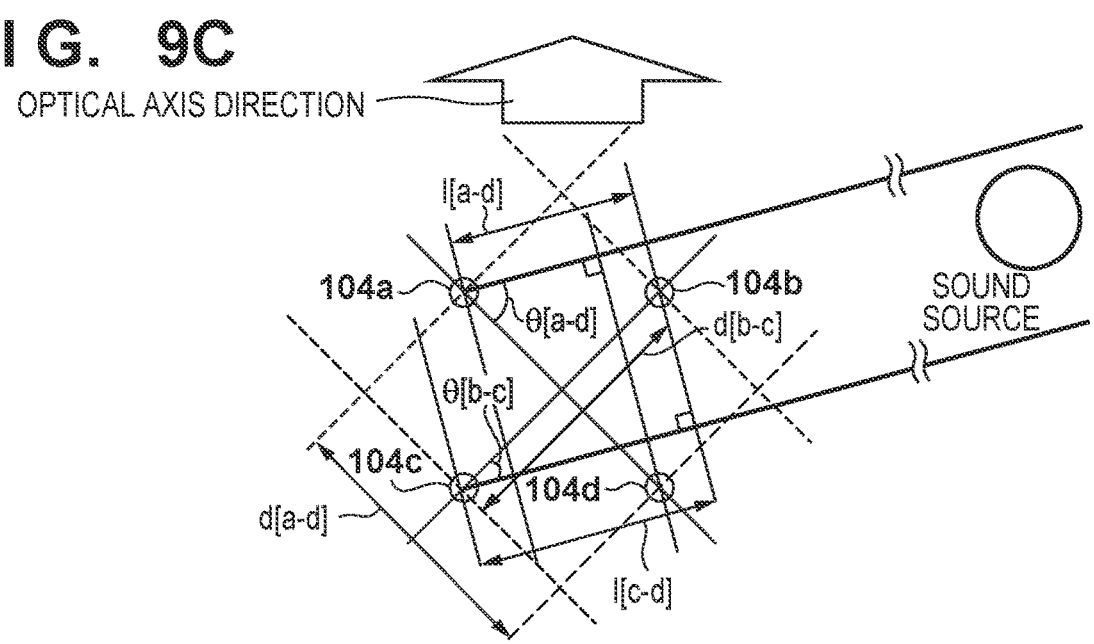
FIG. 9C is a diagram illustrating the sound direction detection method according to an embodiment.

Thus, the detection method of the sound source direction in the present embodiment will be described using FIGS. 9B and 9C as follows. Specifically, since there are two sound source directions that can be estimated using two mics, these two directions are treated as provisional directions. Also, a sound source direction is obtained using another two mics, and two provisional directions are obtained. Then, the direction that is common between these provisional directions is determined as the sound source direction to be obtained. Note that the upper direction in FIGS. 9B and 9C is assumed to be the image capturing direction of the movable image capturing unit 100. The image capturing direction of the movable image capturing unit 100 can also be rephrased as an optical axis direction (principal axis direction) of the lens unit 101.

FIG. 9B illustrates a method in which three mics are used. Description will be given using mics 104a, 104b, and 104c. In an arrangement as illustrated in FIG. 3A, the direction orthogonal to the direction in which the mics 104a and 104b are lined up is the image capturing direction of the lens unit 101.

As described with reference to FIG. 9A, the distance d[a-b] is known from the positions of the mics 104a and 104b, and therefore, if the distance l[a-b] can be specified from sound data, θ[a-b] can be specified. Moreover, since the distance d[a-c] between the mics 104a and 104c is known, the distance l[a-c] can also be specified from sound data, and θ[a-c] can be specified. If θ[a-b] and θ[a-c] can be calculated, the angle that is common between these angles on a two-dimensional plane (on a plane vertical to the rotation axis of a panning operation) that is the same as the plane on which the mics 104a, 104b, and 104c are arranged can be determined as the accurate sound generation direction.

A method of determining the sound source direction using four mics will be described using FIG. 9C. Due to the arrangement of the mics 104a, 104b, 104c, and 104d shown in FIG. 3A, the direction orthogonal to the direction in which the mics 104a and 104b are lined up is the image capturing direction (optical axis direction) of the lens unit 101. When four mics are used, if two pairs, namely a pair of mics 104a and 104d and a pair of mics 104b and 104c that are each positioned on a diagonal line, the sound source direction can be accurately calculated.

Since the distance d[a-d] between the mics 104a and 104d is known, the distance l[a-d] can be specified from sound data, and θ[a-d] can also be specified.

Moreover, since the distance d[b-c] between the mics 104b and 104c is known, the distance l[b-c] can be specified from sound data, and θ[b-c] can also be specified.

Therefore, once θ[a-d] and θ[b-c] are known, sound generation direction can be accurately detected on a two-dimensional plane that is the same as the plane on which the mics are arranged.

Moreover, the detection accuracy of the angle of direction can also be improved by increasing the number of detection angles such as θ[a-b] and θ[c-d].

In order to perform the processing described above, the mics 104a and 104b and the mics 104c and 104d are arranged at four vertices of a rectangle, as shown in FIG. 3A. Note that the number of mics need not be four, and may be three as long as the three mics are not lined up on a straight line.

The demerit of the method described above is that only a sound direction on the same two-dimensional plane can be detected. Therefore, when the sound source is positioned right above the image capturing apparatus 1, the direction cannot be detected. Therefore, next, the principle of determination, in the sound direction detection unit 2044, as to whether or not the direction in which a sound source is present is the right-above direction will be described with reference to FIGS. 10A and 10B.

Figure 10A:
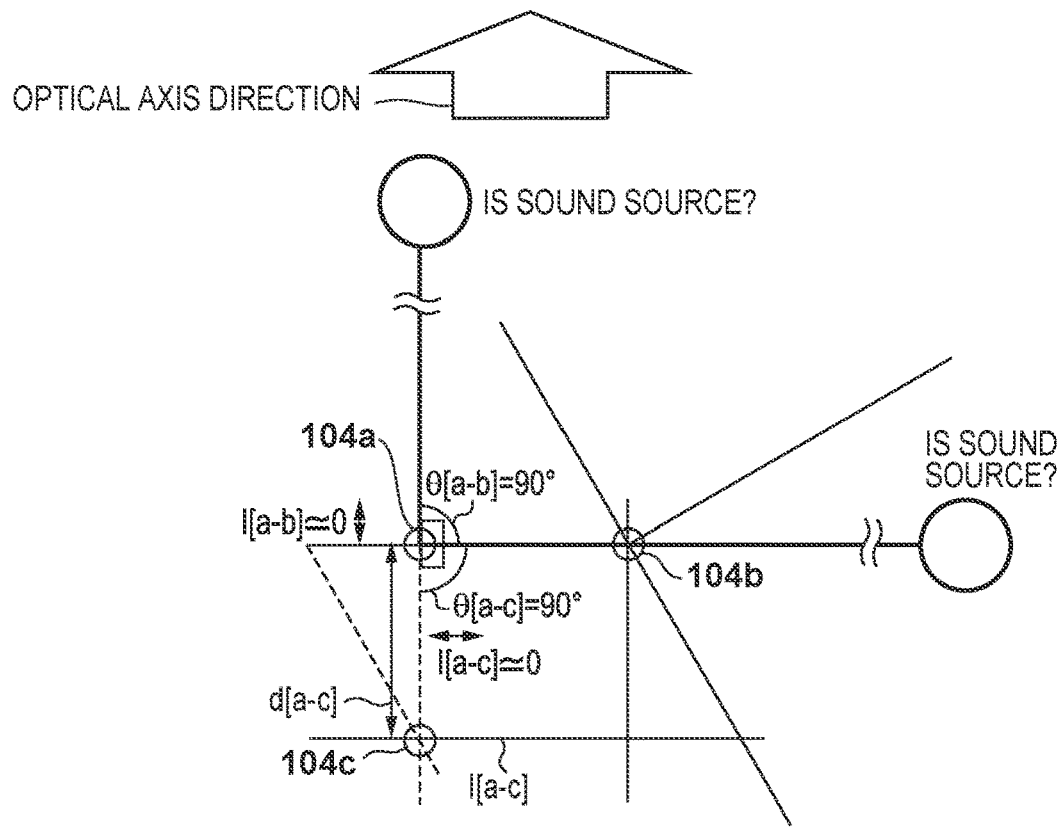
FIG. 10A is a diagram illustrating a detection method when a sound source is present right above the image capturing apparatus.

FIG. 10A is a diagram illustrating a method using three mics. Description will be given using the mics 104a, 104b, and 104c. When the mics are arranged as shown in FIG. 3A, the direction orthogonal to the direction in which the mics 104a and 104b are lined up is the image capturing direction (optical axis direction) of the lens unit 101. The direction in which the mics 104a and 104b are lined up is the direction of a straight line that connects the central point of the mic 104a and the central point of the mic 104b.

A case where sound enters the mics 104a, 104b, and 104c in the direction of a straight line intersecting the plane on which the sound input unit 104 is arranged, that is, from above, will be described.

Here, when a sound source is positioned right above the image capturing apparatus 1, it can be regarded that the mics 104a and 104b are at an equal distance from the sound source. That is, there is no difference in arrival time of sound from the sound source between the two mics 104a and 104b. Therefore, it can be recognized that the sound source is present in a direction that vertically intersects the straight line connecting the mics 104a and 104b.

Moreover, it can be similarly regarded that the mics 104a and 104c are at an equal distance from the sound source, and therefore there is also no difference in arrival time of sound from the sound source between the two mics 104a and 104c. Therefore, it can be recognized that the sound source is present in a direction that vertically intersects the straight line connecting the mics 104a and 104c.

That is, when the absolute value of difference in time of sound detected by the mics 104a and 104b is denoted by ΔT1, the absolute value of difference in time of sound detected by the mics 104a and 104c is denoted by ΔT2, and a relationship with a preset sufficiently small threshold value ε satisfies the following condition, it can be determined that the sound source is positioned right above the image capturing apparatus 1.

condition: ΔT1<ε and ΔT2<ε

Figure 10B:
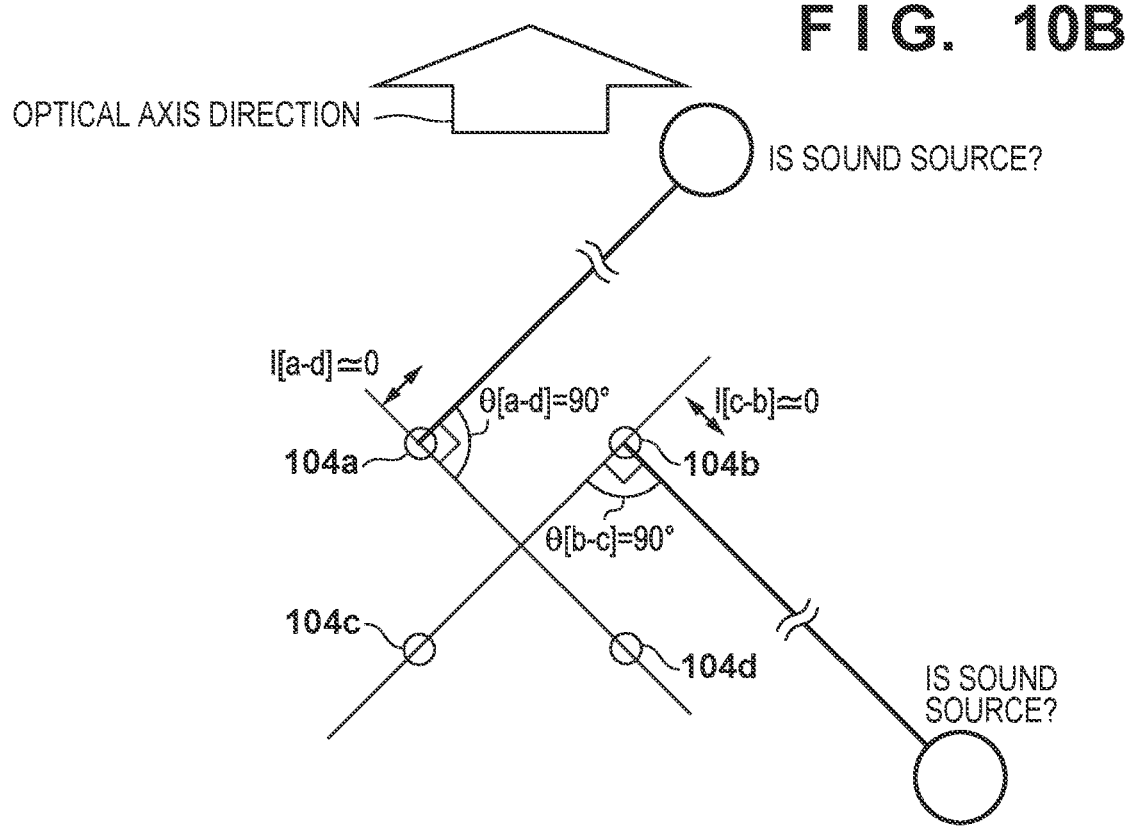
FIG. 10B is a diagram illustrating the detection method when a sound source is present right above the image capturing apparatus.

The detection method of a sound source positioned right above the image capturing apparatus 1 using the four mics 104a, 104b, 104c, and 104d will be described with reference to FIG. 10B. As shown in FIG. 3A, the pair of mics 104a and 104d and the pair of mics 104b and 104c will be considered.

When a sound source is present right above the image capturing apparatus 1, the mics 104a and 104d are at the equal distance from the sound source, the absolute value ΔT3 of the difference in time of sound detected by these mics 104a and 104d is zero or an extremely small value. That is, it is recognized that the sound source is present in a direction that vertically intersects the straight line connecting the mics 104a and 104d.

Moreover, because the mics 104b and 104c are also at an equal distance from the sound source, the absolute value ΔT4 of the difference in time of sound detected by these mics 104b and 104c is also zero or an extremely small value. That is, it is recognized that the sound source is present in a direction that vertically intersects the straight line connecting the mics 104b and 104c. Therefore, if the following condition is satisfied, it can be determined that the sound source is positioned right above the image capturing apparatus 1.

condition: ΔT3<ε and ΔT4<ε

As described above, the absolute values of differences in time-of-arrival of sound are obtained with respect to two pairs of mics out of three or more mics, and when the two absolute values are both less than the sufficiently small threshold value, it can be determined that the direction in which the sound source is present is the right-above direction. Note that, when two pairs are determined, any combination is allowed as long as the directions of the two pairs are not parallel to each other.

The first embodiment has been described above. According to the embodiment described above, an object other than the person (face thereof) who spoke a voice command is kept from being erroneously recognized as the subject. Also, the job intended by a person who spoke a voice command can be executed.

Moreover, as described in the above embodiment, power to each of the mics 104a to 104d and the elements that constitute the sound signal processing unit 204 is supplied after entering a stage at which the element is actually used, under the control of the central control unit 201, and therefore power consumption can be suppressed compared with a case where all of the constituent elements are in operable states.

Second Embodiment

A second embodiment will be described. The configuration of the apparatus in the second embodiment is assumed to be the same such as that of the first embodiment. Also, a description will be given assuming that the voice command recognition unit 2043 has already recognized the moving image shooting command as a voice command, and the sound direction detection unit 2044 has already detected the direction in which a user who spoke the voice command is present.

In the first embodiment, the image capturing apparatus 1, upon recognizing the moving image shooting command as a voice command, performs panning and tilting operations of the movable image capturing unit 100 such that the direction in which the source of the voice command is present matches the image capturing direction (optical axis direction) of the lens unit 101. Also, the image capturing apparatus 1 performs subject detection processing while performing the panning and tilting operations. Also, finally, the image capturing apparatus 1 starts shooting and recording of a moving image of a subject on the condition that the subject is present in an image captured by the image capturing unit 102.

Therefore, a user needs to wait for a small amount of time (wait time), even if the user has spoken the moving image shooting command, until the job is executed. Also, there is also a problem that, because the image obtained from the image capturing unit 102 flows in a horizontal direction while the panning operation is performed, focusing by the lens unit 101 is difficult.

Therefore, in the second embodiment, an example in which starting of a job, by the image capturing unit 102, in an out of focus state can be suppressed while shortening the wait time will be described. Specifically, the central control unit 201 causes the pivoting control unit 213 to perform a panning operation at a high speed first panning operation speed so as to face toward a sound direction (hereinafter, referred to as "target direction") detected by the sound direction detection unit 2044. The period during which driving is performed at this first panning operation speed is a period until the direction of the image capturing direction (optical axis direction) of the lens unit 101 reaches an angle that is half the difference between the angle thereof immediately before the panning operation was started and the target direction, for example, and the image capturing apparatus 1 does not perform focusing control in this period (period in which driving is performed at the first panning operation speed). Also, when the difference in angle between the image capturing direction (optical axis direction) of the lens unit 101 and the target direction has reduced to half the difference in angle therebetween when the voice was recognized, the central control unit 201 controls the pivoting control unit 213 to perform panning at a second panning operation speed that is slower than the first panning operation speed, and at which focusing is possible. Also, the central control unit 201 starts focusing control of the lens unit 101 by controlling the lens actuator control unit 103 in a period in which the panning operation is performed at the second panning operation speed. Also, the central control unit 201 starts shooting and recording of a moving image when the following condition is satisfied.

condition: image captured by the image capturing unit 102 is in a focused state, and the difference in angle between the image capturing direction (optical axis direction) of the lens unit 101 and the target direction is a preset threshold value α or less Here, the threshold value α is an angle formed by left and right ends of the angle of view that the image capturing unit 102 can capture and the center thereof. This is because, if the angle decreases to the preset threshold value α or less, it can be estimated that the subject will start entering the image captured by the image capturing unit 102. Here, the second panning operation speed v2 is a speed decelerated at a predetermined rate from the first panning operation speed v1, which is an initial speed.

Figure 11A:
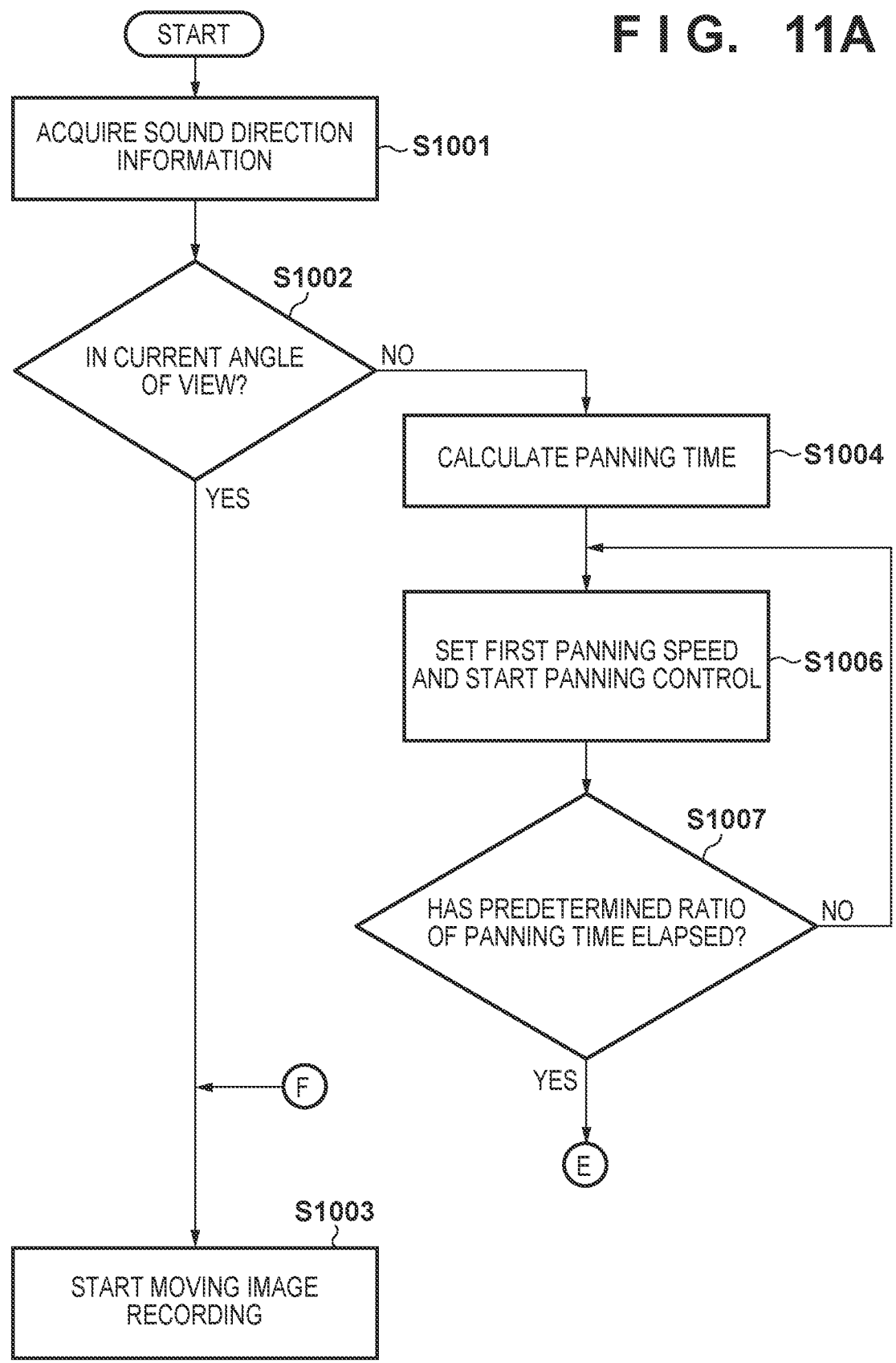
FIG. 11A is a flowchart illustrating a process procedure of a central control unit in the second embodiment.
Figure 11B:
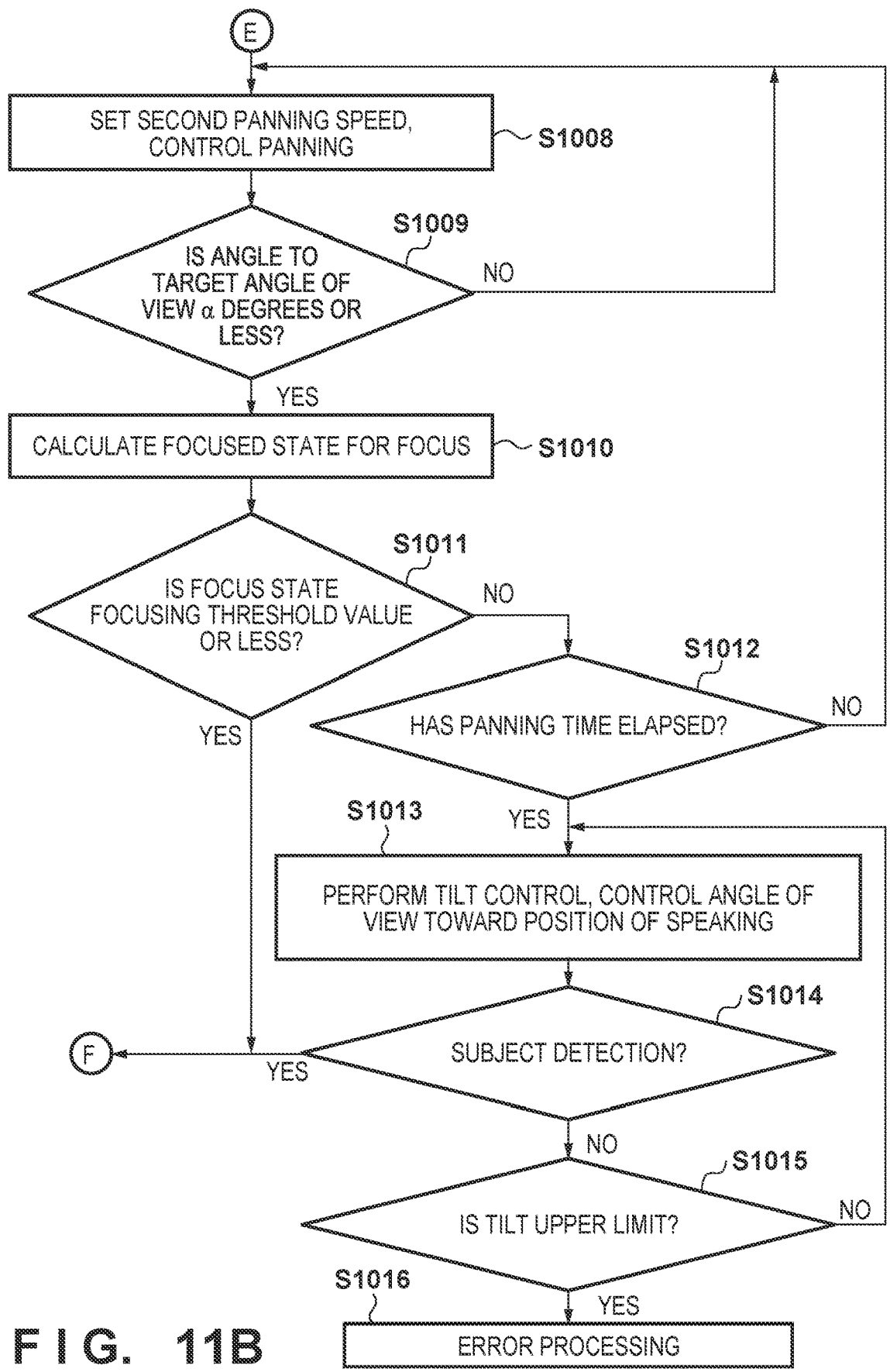
FIG. 11B is a flowchart illustrating a process procedure of the central control unit in the second embodiment.

FIGS. 11A and 11B are flowcharts illustrating processing in which the start thereof is triggered by the voice command recognition unit 2043 in the second embodiment having recognized a voice command. The program relating to this flowchart is stored in a ROM included in the central control unit 201. FIG. 12 is a diagram illustrating a sequence of processing after a voice command has been recognized in the second embodiment. In the following, the processing of the central control unit 201 in the second embodiment will be described with reference to these diagrams. Also, a description will be given here assuming that the moving image shooting command has been recognized as a voice command.

First, in step S1001, the central control unit 201 acquires sound direction information detected in an active period (also in a spoken period) indicated by start and end addresses of sound data based on which the voice command has been recognized by the voice command recognition unit 2043, from the buffer memory 2044a of the sound direction detection unit 2044. Also, in step S1002, the central control unit 201 determines whether or not the direction indicated by the acquired sound direction information is in the current angle of view of the image capturing unit 102 of the movable image capturing unit 100.

If the direction indicated by the acquired sound direction information is in the current angle of view of the image capturing unit 102, the central control unit 201 advances the processing to step S1003, and starts recognized shooting and recording of a moving image.

On the other hand, if the direction indicated by the acquired sound direction information is out of the current angle of view of the movable image capturing unit 100, the central control unit 201 advances the processing to step S1004. In step S1004, the central control unit 201 calculates an angle θ of the panning operation to be performed from the current image capturing direction (optical axis direction) A of the lens unit 101 and a sound source direction C acquired in step S1001, and calculates a time (=t4−t0) necessary for performing the panning operation when the panning operation is performed at the first panning operation speed v1 in a region (first half section) from the image capturing direction A to an angle half of the angle of the entire panning operation, and the panning operation is decelerated at the predetermined rate in the region (second half section) of the remaining half of the angle.

A description will be given assuming that the lens unit 101 uses a PI (Photo Interrupter) that uses a method in which the position is detected by a light receiving portion detecting light from a light emitting portion being interrupted by an object. In this case, the current lens unit 101 direction is denoted by A, the target direction is denoted by C, and the direction at an angle half of the angle formed by the direction A of the lens unit 101 and the target direction C is denoted by B. The number of steps PIAC of the PI is determined in accordance with the angle θ formed by the direction A of the lens unit 101 and the target direction C. The central control unit 201 calculates the distance DAB of the first half section in which driving is performed at the first panning operation speed, and the distance DBC of the second half section in which driving is performed at the second panning operation speed, from this number of steps PIAC. The period (t1−t0) in which driving is performed at the first panning operation speed in the first half section can be obtained by DAB/v1. Also, the period (t4−t1) in which driving is performed at the second panning operation speed v2 in the second half section is DBC/v2 (note that DBC=DAB, in the present embodiment). Here, as described above, the second panning operation speed v2 is a speed that decreases from the first panning operation speed v1, which is an initial speed, at a predetermined rate.

In step S1006, the central control unit 201 starts a panning operation of the movable image capturing unit 100 at the first panning operation speed v1 toward the target direction, by controlling the pivoting control unit 213. Also, in step S1007, the central control unit 201 continues this panning operation until it is determined that the period of the panning operation has reached DAB/v1.

Then, when the period from when the panning operation was started reaches DAB/v1, in step S1008, the central control unit 201 sets the panning operation speed to the second panning operation speed v2 until time t4 at which the panning operation is ended. Also, in step S1009, the central control unit 201 determines whether or not the angle formed by the current image capturing direction (optical axis direction) of the lens unit 101 and the target direction is the preset threshold value α or less. If the angle is the preset threshold value α or less, it is possible that the subject is in the angle of view, and therefore, in step S1010, the central control unit 201 determines a focus state value AF. Also, in step S1011, the central control unit 201 determines whether or not the obtained focus state value AF is a predetermined threshold value AFth or less. When the focus state value AF is the predetermined threshold value AFth or less, an in-focus state is entered. Therefore, the central control unit 201 advances the processing to step S1003 in order to start a job based on the recognized moving image shooting command even if the panning operation has not been completed.

On the other hand, if the focus state value AF exceeds the predetermined threshold value AFth, the central control unit 201 advances the processing to step S1012, and determines whether or not the panning operation period that was initially planned has elapsed. Note that, in step S1012, the central control unit 201 may determine whether or not the image capturing direction (optical axis direction) of the lens unit 101 has reached the target direction. Also, if the determination in step S1012 is negative (No), the central control unit 201 returns the processing to step S1008.

On the other hand, if the determination in step S1012 is positive (Yes), the central control unit 201 advances the processing to step S1013. In step S1013, the central control unit 201, by controlling the pivoting control unit 213, switches the driving by the pivot drive unit from a panning operation to a tilting operation, and starts the tilting operation.

Also, in step S1014, the central control unit 201 continues the tilting operation in step S1013 until it is determined that a subject has been detected, or a tilting upper limit is reached. If a subject has been detected (timing t5), the central control unit 201 stops the tilting operation, and advances the processing to step S1003. On the other hand, if the tilting upper limit has been reached (timing t6) without a subject having been detected, the central control unit 201 performs error processing. For this error, the error processing may be processing in which a recognized still image shooting start command is not executed, or the like.

While a description has been made above, if the processing according to the second embodiment is applied to the first embodiment, the processing in step S160 and onward need only be replaced by the processing in step S1002 and onward in the second embodiment. In this case, the processing in step S1015 in the second embodiment corresponds to the processing in step S163.

Note that, in the second embodiment described above, an example has been described in which the panning operation period for causing the image capturing direction (optical axis direction) of the lens unit 101 to match the target direction is divided into two periods, and the first panning operation speed is set in the former period, and in the latter period, the panning operation speed is switched to the second panning operation speed that is slower than the first panning operation speed. However, a configuration may be adopted in which after the driving period at the first panning operation speed has elapsed, deceleration may be performed at a fixed rate such that the panning operation speed is zero at the target direction.

As described above, according to the second embodiment, even in a case where the position at which a specific voice is generated is out of the current angle of view A, and a subject needs to be captured by changing the angle of view by performing panning and tilting driving, moving image recording can be started after unnecessary panning and tilting driving or focusing. Moreover, as a result of switching the speed of the panning operation, focusing can be made, and the timing at which moving image recording is started can also be set ahead of that in the first embodiment.

In the embodiments described above, an example has been described in which the sound pressure level detection unit 2041, the voice command recognition unit 2043, the sound direction detection unit 2044, the moving image sound processing unit 2045, and the like are processing units separated from the central control unit 201. However, the configuration may be such that the central control unit 201 replaces all of or some of these processing units by executing a program.

According to the present disclosure, it is possible to capture an image at a timing intended by a user with a composition intended by the user, without the user performing a special operation.

Other Embodiments

Some Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An image capturing apparatus comprising:
    an image capturing unit;
    a driving unit for moving an image capturing direction of the image capturing unit;
    a sound collecting unit;
    a detecting unit for detecting a sound pressure level of a voice sound collected by the sound collecting unit;
    a recognizing unit for recognizing that the voice sound collected by the sound collecting unit is an instruction for shooting by the image capturing unit; and
    a control unit,
    wherein the control unit controls the image capturing unit to shoot in response that the detecting unit detects the sound pressure level of the voice sound collected by the sound collecting unit is larger than a predetermined sound pressure level, and that the recognizing unit recognizes the voice sound as the instruction for shooting by the image capturing unit, and
    wherein the sound collecting unit includes a plurality of microphones arranged on a plane vertical to a rotation axis of a panning operation performed by the driving unit.

2. The image capturing apparatus according to claim 1, wherein the control unit activates the recognizing unit in response that the sound pressure level of the voice sound collected by the sound collecting unit has detected larger than the predetermined sound pressure level by the detecting unit.

3. The image capturing apparatus according to claim 1, wherein the plurality of microphones includes a first microphone and a second microphone, and
    wherein the first microphone is arranged in one region, and the second microphone is arranged in the other region in a case where the image capturing apparatus is divided into two regions by a plane that is vertical to a bottom face of the image capturing apparatus and includes an optical axis of the image capturing unit.

4. The image capturing apparatus according to claim 3, wherein the first microphone and the second microphone are symmetrically arranged relative to the optical axis of the image capturing unit.

5. The image capturing apparatus according to claim 3, wherein, in a case where the image capturing unit shoots a moving image, the first microphone collects L-channel sound of the moving image and the second microphone collects R-channel sound of the moving image.

6. The image capturing apparatus according to claim 3, wherein the plurality of microphones further includes a third microphone that is arranged in a portion that is not on a straight line connecting a point of the first microphone and a point of the second microphone, and
    wherein the control unit detects a direction of a source of the voice sound based on a direction of the source of the voice sound detected using the first microphone and the second microphone and on a direction of a sound source detected using the third microphone and a microphone other than the third microphone.

7. The image capturing apparatus according to claim 6, wherein the control unit determines that the sound source is present in an axial direction of the rotation axis in a case where the direction of the source of the voice sound is vertical to the straight line connecting the point of the first microphone and the point of the second microphone, which the direction has detected using the first microphone and the second microphone, and the direction of the source of the voice sound is vertical to a straight line connecting the point of the third microphone and the point of a microphone other than the third microphone, the direction has detected using the third microphone and the microphone other than the third microphone.

8. The image capturing apparatus according to claim 6, further comprising a power supply unit,
wherein the power supply unit supplies power to all microphones of the sound collecting unit in response to the control unit detecting that, a voice sound level has exceeded the predetermined sound pressure level in a state that the power supply unit has supplied power to not all the microphones of the plurality of microphones, and
wherein the control unit detects the direction of the source of the voice sound.

9. The image capturing apparatus according to claim 6,
wherein the control unit controls the driving unit to perform the panning operation to move the image capturing direction of the image capturing unit to direct toward a direction of the source of the voice sound,
wherein the control unit controls the driving unit to perform a tilting operation to move the image capturing direction of the image capturing unit to direct toward the direction of the source of the voice sound in a case where the image capturing direction has directed toward the direction of the source of the voice sound, and
wherein the control unit controls the driving unit to stop the tilting operation of the image capturing unit in a case where the image capturing unit has detected a subject.

10. The image capturing apparatus according to claim 1,
wherein, in a case where a panning distance over the panning operation performed by the driving unit is divided into two sections, the control unit controls the driving unit to perform a panning operation at a first speed in a former section, and to perform a panning operation at a speed decelerated from the first speed in a latter section, and
wherein the image capturing unit does not perform a focusing operation in the former section, and performs a focusing operation in the latter section.

11. The image capturing apparatus according to claim 1,
wherein the control unit controls the driving unit to move the image capturing direction of the image capturing unit to track a subject in response to a voice instruction to shoot, and
wherein the image capturing unit performs shooting and recording of a still image or of a moving image.

12. A control method for controlling an image capturing apparatus including an image capturing unit, a driving unit for moving an image capturing direction of the image capturing unit, a sound collecting unit, a detecting unit for detecting a sound pressure level of a voice sound collected by the sound collecting unit, and a recognizing unit for recognizing that the voice sound collected by the sound collecting unit is an instruction for shooting by the image capturing unit, the control method comprising:
performing control the image capturing unit to shoot in response that the detecting unit detects the sound pressure level of the voice sound collected by the sound collecting unit is larger than a predetermined sound pressure level, and that the recognizing unit recognizes the voice sound as the instruction for shooting by the image capturing unit,
wherein the sound collecting unit includes a plurality of microphones arranged on a plane vertical to a rotation axis of a panning operation performed by the driving unit.

13. A non-transitory recording medium that records a program for causing an image capturing apparatus comprising an image capturing unit, a driving unit for moving an image capturing direction of the image capturing unit, a sound collecting unit, a detecting unit for detecting a sound pressure level of a voice sound collected by the sound collecting unit, a recognizing unit for recognizing that the voice sound collected by the sound collecting unit is an instruction for shooting by the image capturing unit, to execute a control method comprising:
performing control the image capturing unit to shoot in response that the detecting unit detects the sound pressure level of the voice sound collected by the sound collecting unit is larger than a predetermined sound pressure level, and that the recognizing unit recognizes the voice sound as the instruction for shooting by the image capturing unit,
wherein the sound collecting unit includes a plurality of microphones arranged on a plane vertical to a rotation axis of a panning operation performed by the driving unit.

* * * * *